(12) United States Patent
James et al.

(10) Patent No.: US 6,810,452 B1
(45) Date of Patent: Oct. 26, 2004

(54) METHOD AND SYSTEM FOR QUARANTINE DURING BUS TOPOLOGY CONFIGURATION

(75) Inventors: David V. James, Palo Alto, CA (US); Bruce Fairman, Woodside, CA (US); Richard Scheel, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/531,080

(22) Filed: Mar. 18, 2000

Related U.S. Application Data

(60) Provisional application No. 60/177,077, filed on Jan. 19, 2000, provisional application No. 60/170,962, filed on Dec. 15, 1999, provisional application No. 60/167,958, filed on Nov. 29, 1999, provisional application No. 60/158,722, filed on Oct. 11, 1999, provisional application No. 60/155,305, filed on Sep. 21, 1999, provisional application No. 60/150,393, filed on Aug. 23, 1999, provisional application No. 60/144,101, filed on Jul. 16, 1999, provisional application No. 60/137,916, filed on Jun. 7, 1999, provisional application No. 60/130,698, filed on Apr. 23, 1999, and provisional application No. 60/125,321, filed on Mar. 19, 1999.

(51) Int. Cl.[7] .............................................. G06F 13/00
(52) U.S. Cl. ............................ 710/104; 710/8; 713/100
(58) Field of Search ................................ 710/305–317, 710/104, 8–19; 713/1, 2, 100; 709/220–222, 225, 238, 242

(56) References Cited

U.S. PATENT DOCUMENTS

| 4,538,259 A | 8/1985 | Moore .......................... 370/60 |
| 4,935,894 A | 6/1990 | Ternes et al. |
| 5,381,138 A | 1/1995 | Stair et al. ............. 340/825.44 |
| 5,394,556 A | * 2/1995 | Oprescu ...................... 709/220 |
| 5,402,416 A | 3/1995 | Cieslak et al. ................. 370/60 |
| 5,414,839 A | 5/1995 | Joshi |

(List continued on next page.)

OTHER PUBLICATIONS

Gary Hoffman and Daniel Moore, "IEEE 1394: A Ubiquitous Bus," COMPCON '95, presented on Mar. 5 to 9, 1995, http://www.skipstone.com/compcon.html, pp. 1–9.

Roger Jennings, "Fire on the Wire: The IEEE 1934 High Performance Serial Bus," Apr. 8, 1999, http://www-.chumpchange.com/parkplace/video/dvpapers/firewire-.html, pp. 1–18.

(List continued on next page.)

*Primary Examiner*—Sumati Lefkowitz
(74) *Attorney, Agent, or Firm*—Blakely, Sokoloff, Taylor & Zafman LLP

(57) ABSTRACT

A method and system for quarantine during bus topology configuration are described. In one embodiment, the invention is a method. The method includes quarantining a set of devices coupled to a bus. The method further includes establishing a topology of the bus. The method may also include receiving a reset signal and quarantining in response to the reset signal. In an alternate embodiment, the invention is a system. The system includes a bus having a reset signal and a plurality of data signals. The system also includes a set of devices, with each device of the set of devices coupled to the bus. The system further includes a controller. The controller having a memory configured to store device identifiers corresponding to the devices of the set of devices. The memory further configured to store quarantine information relating to the devices of the set of devices.

38 Claims, 24 Drawing Sheets

U.S. PATENT DOCUMENTS

| | | | |
|---|---|---|---|
| 5,485,505 A | 1/1996 | Norman et al. ............... 379/58 |
| 5,511,165 A | 4/1996 | Brady et al. |
| 5,579,486 A | 11/1996 | Oprescu et al. |
| 5,603,084 A | 2/1997 | Henry, Jr. et al. .......... 455/331 |
| 5,623,483 A | 4/1997 | Agrawal et al. ............ 370/253 |
| 5,630,173 A | 5/1997 | Oprescu |
| 5,669,002 A | 9/1997 | Buch |
| 5,684,796 A | 11/1997 | Abidi et al. |
| 5,684,959 A | 11/1997 | Bhat et al. ............. 395/200.11 |
| 5,689,499 A | 11/1997 | Hullett et al. ............... 370/235 |
| 5,717,853 A | 2/1998 | Deshpande et al. |
| 5,724,517 A | 3/1998 | Cook et al. ............ 395/200.57 |
| 5,734,824 A | 3/1998 | Choi |
| 5,751,967 A | 5/1998 | Raab et al. |
| 5,757,772 A | 5/1998 | Thornberg et al. .......... 370/236 |
| 5,764,930 A | 6/1998 | Staats ......................... 710/107 |
| 5,774,683 A | 6/1998 | Gulick |
| 5,790,530 A | 8/1998 | Moh et al. .................. 370/363 |
| 5,790,815 A | 8/1998 | Swanstrom et al. ........ 395/300 |
| 5,812,774 A | 9/1998 | Kempf et al. .......... 395/200.42 |
| 5,825,752 A | 10/1998 | Fujimori et al. ............ 370/260 |
| 5,828,899 A | 10/1998 | Richard et al. |
| 5,832,245 A | 11/1998 | Gulick |
| 5,842,124 A | 11/1998 | Kenagy et al. ............. 455/418 |
| 5,848,266 A | 12/1998 | Scheurich ................... 395/558 |
| 5,854,910 A | 12/1998 | Gulick |
| 5,870,387 A | 2/1999 | Mulla ......................... 370/258 |
| 5,872,524 A | 2/1999 | Iida ....................... 340/825.52 |
| 5,872,944 A | 2/1999 | Goldrian et al. ............ 395/306 |
| 5,875,301 A | 2/1999 | Duckwall et al. |
| 5,883,621 A | 3/1999 | Iwamura ..................... 345/327 |
| 5,892,929 A | 4/1999 | Welker ....................... 710/107 |
| 5,901,332 A | 5/1999 | Gephardt et al. ........... 395/861 |
| 5,905,732 A | 5/1999 | Fimoff et al. ............... 370/516 |
| 5,910,178 A | 6/1999 | Moh et al. .................. 709/232 |
| 5,920,267 A | 7/1999 | Tattersall et al. ...... 340/825.05 |
| 5,923,673 A | 7/1999 | Henrikson |
| 5,930,703 A | 7/1999 | Cairns ........................ 455/418 |
| 5,935,208 A | 8/1999 | Duckwall et al. ........... 709/221 |
| 5,941,964 A | 8/1999 | Young et al. |
| 5,961,623 A | 10/1999 | James et al. ................ 710/113 |
| 5,970,234 A | 10/1999 | Jin |
| 5,974,036 A | 10/1999 | Acharya et al. ............ 370/331 |
| 5,978,854 A | 11/1999 | Fujimori et al. ............ 709/245 |
| 5,991,520 A | 11/1999 | Smyers et al. .............. 395/280 |
| 6,005,852 A | 12/1999 | Kokko et al. ............... 370/329 |
| 6,023,732 A | 2/2000 | Moh et al. .................. 709/232 |
| 6,032,202 A | 2/2000 | Lea et al. |
| 6,032,211 A | 2/2000 | Hewitt ........................ 710/107 |
| 6,038,625 A | 3/2000 | Ogino et al. ................ 710/104 |
| 6,055,561 A | 4/2000 | Feldman et al. |
| 6,072,722 A | 6/2000 | Hirano |
| 6,072,772 A | 6/2000 | Charny et al. .............. 370/229 |
| 6,085,270 A | 7/2000 | Gulick ........................ 710/100 |
| 6,104,706 A | 8/2000 | Richter et al. .............. 370/263 |
| 6,108,718 A | 8/2000 | Fujimori et al. ................ 710/9 |
| 6,119,243 A | 9/2000 | Garney et al. .............. 713/600 |
| 6,131,119 A * | 10/2000 | Fukui ......................... 709/224 |
| 6,137,777 A | 10/2000 | Vaid et al. .................. 370/230 |
| 6,138,178 A | 10/2000 | Watanabe ...................... 710/8 |
| 6,138,196 A | 10/2000 | Takayama et al. .......... 710/105 |
| 6,141,767 A | 10/2000 | Hu et al. ........................ 714/1 |
| 6,148,241 A | 11/2000 | Ludtke et al. |
| 6,151,651 A | 11/2000 | Hewitt et al. ............... 710/129 |
| 6,157,972 A | 12/2000 | Newman et al. |
| 6,160,796 A | 12/2000 | Zou |
| 6,185,632 B1 | 2/2001 | Berkema ...................... 710/20 |
| 6,192,428 B1 | 2/2001 | Abramson et al. ............ 710/52 |
| 6,219,697 B1 * | 4/2001 | Lawande et al. ........... 709/221 |
| 6,359,901 B1 | 3/2002 | Todd et al. |
| 6,360,287 B1 | 3/2002 | Kawamura |
| 6,378,000 B1 | 4/2002 | Akatsu et al. |
| 6,389,496 B1 | 5/2002 | Matsuda |
| 6,434,117 B1 * | 8/2002 | Momona ..................... 370/236 |
| 6,463,550 B1 * | 10/2002 | Cepulis et al. ................ 714/25 |
| 6,496,945 B2 * | 12/2002 | Cepulis et al. ................ 714/25 |
| 6,513,064 B1 | 1/2003 | Leung et al. |
| 6,522,654 B1 * | 2/2003 | Small ......................... 370/400 |
| 6,571,139 B1 | 5/2003 | Kawamura et al. |

OTHER PUBLICATIONS

1394 Trade Association, The Multimedia Connection, TA Document 1999026, A V/C General Command and Response Model 4.1, Draft 0.1:35, May 22, 1999, pp. 1–46.

1394 Trade Association, The Multimedia Connection, TA Document 1999025, A V/C Descriptor and Info Block mechanism, Draft 0.:212, Dec. 17, 1999, pp. 1–143.

"IEEE 1394: A Ubiquitous Bus", Gary Hoffman and Daniel Moore, Compcon '95 in San Francisco, CA Mar. 5–Mar. 9, 1995. http://www.skiptone.com/compcon.html (9 pgs).

"Fire on the Wire: The IEEE 1934 High Performance Serial Bus", The IEEE Microcomputer Standards Committee, 1986. http://www.chumpchange.com/parkplace/video/dvpapers/firewire.html (4 pgs.).

1394 Trade Association, The Multimedia Connection, TA Document 1999026, AV/C General Command and Response Model 4.0, Draft 0.1:35, May 22, 1999, pp. 1–46.

1394 Trade Association, The Multimedia Connection, TA Document 1999025, AV/C General—Descriptor and Info Block Mechanism, Draft 0.2:212, Dec. 17, 1999, pp. 1–143.

* cited by examiner

METHOD AND SYSTEM FOR QUARANTINE DURING BUS TOPOLOGY CONFIGURATION

This application claims benefit of U.S. Provisional Applications No. 60/125,321 filed Mar. 19, 1999; No. 60/130,698 filed Apr. 23, 1999; No. 60/137,916 filed Jun. 7 1999; No. 60/144,101 filed Jul. 16, 1999; No. 60/150,393 filed Aug. 23, 1999; No. 60/155,305 filed Sep. 21, 1999; No. 60/158,722 filed Oct. 11, 1999; No. 60/167,958 filed Nov. 29, 1999; No. 60/170,962 filed Dec. 15, 1999; and No. 60/177,077 filed Jan. 19, 2000.

FIELD OF THE INVENTION

The present invention relates generally to audio, video, and audio/video interconnected systems for home and office use and more specifically to handling resets and topology changes of buses used for interconnection of electronic components.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394-1995, *Standard For A High Performance Serial Bus*, Aug. 30, 1996 (hereinafter "IEEE 1394 standard") and other related 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to adequately handle large amounts of information. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to an intermediate system backbone bus that also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

One particular challenge for bus designers concerns handling topology changes on the bus. Topology changes may necessitate new addresses for devices on the bus, recognition of new devices, recognition of the absence of devices, and recognition of differences in pathways to devices. Furthermore, devices may not be completely compatible with the bus, requiring special handling. Additionally, only a finite number of addresses may be available on a bus, so determining how and when to recycle addresses can prove critical to performance of the bus or devices connected to the bus. In particular, use of a timer dedicated to counting to a predetermined address reuse timeout to determine when it is safe to reuse an address on a bus may lead to additional complexity in design of the bus for the purpose of incorporating the new timer.

SUMMARY OF THE INVENTION

A method and system for quarantine during bus topology configuration are described. In one embodiment, the invention is a method. The method includes quarantining a set of devices coupled to a bus. The method further includes establishing a topology of the bus. The method may also include receiving a reset signal and quarantining in response to the reset signal. In an alternate embodiment, the invention is a system. The system includes a bus having a reset signal and a plurality of data signals. The system also includes a set of devices, with each device of the set of devices coupled to the bus. The system further includes a controller. The controller having a memory configured to store device identifiers corresponding to the devices of the set of devices. The memory further configured to store quarantine information relating to the devices of the set of devices.

BRIEF DESCRIPTION OF THE DRAWINGS

Features and advantages of the prevention invention will be apparent to one skilled in the art in light of the following detailed description in which.

DETAILED DESCRIPTION

A method and system for handling a change in bus topology are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
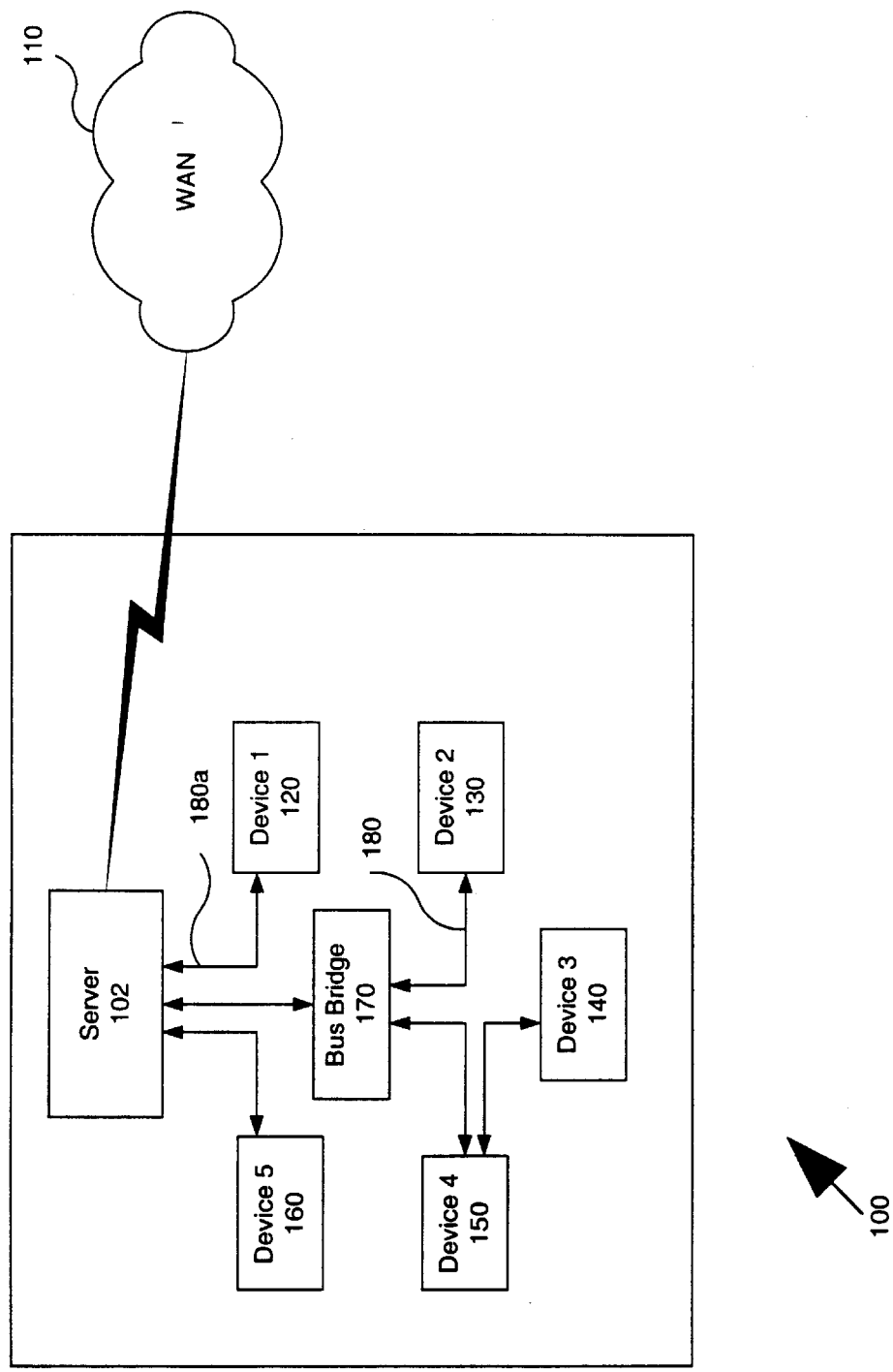
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
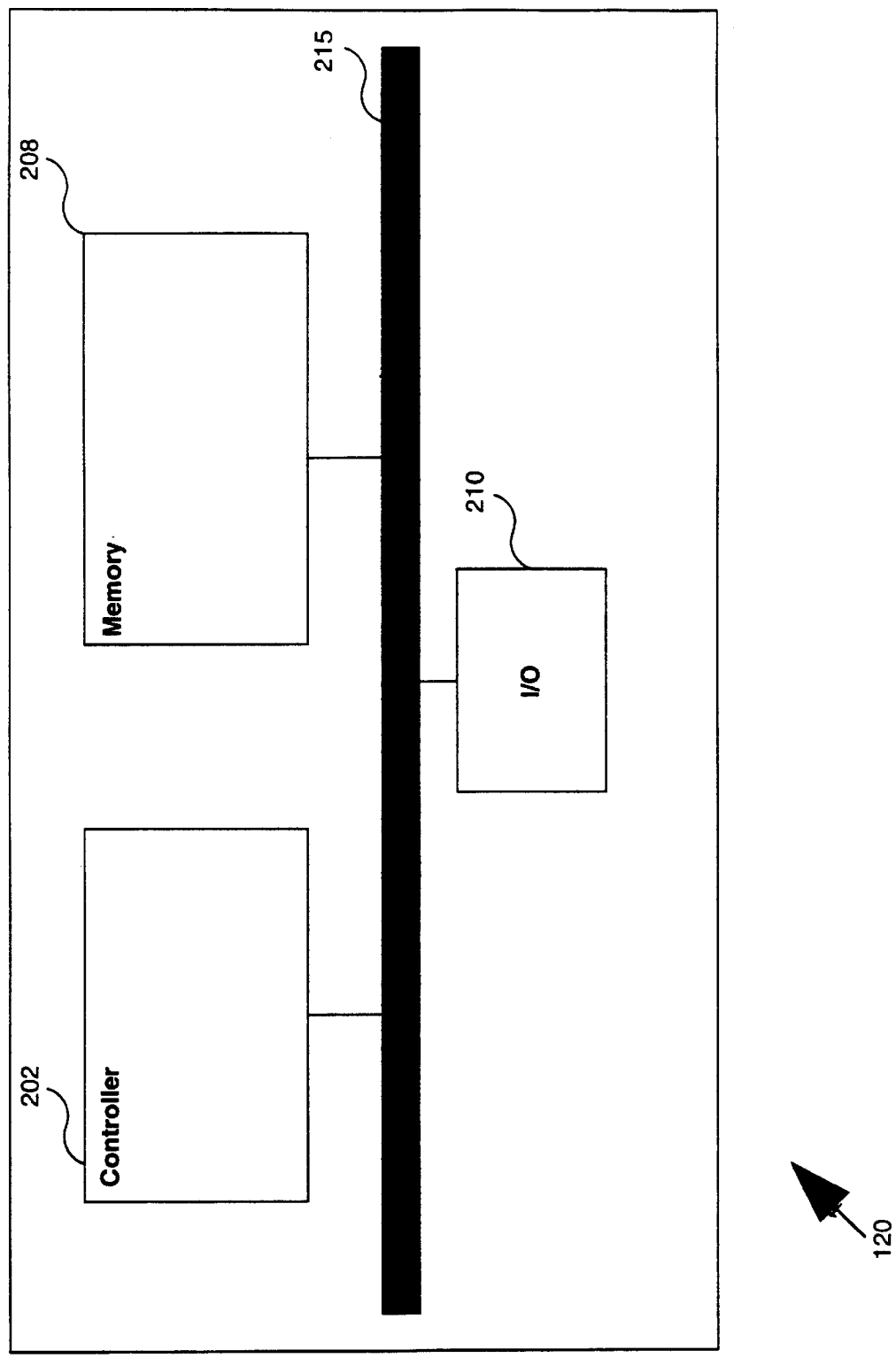
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202, monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
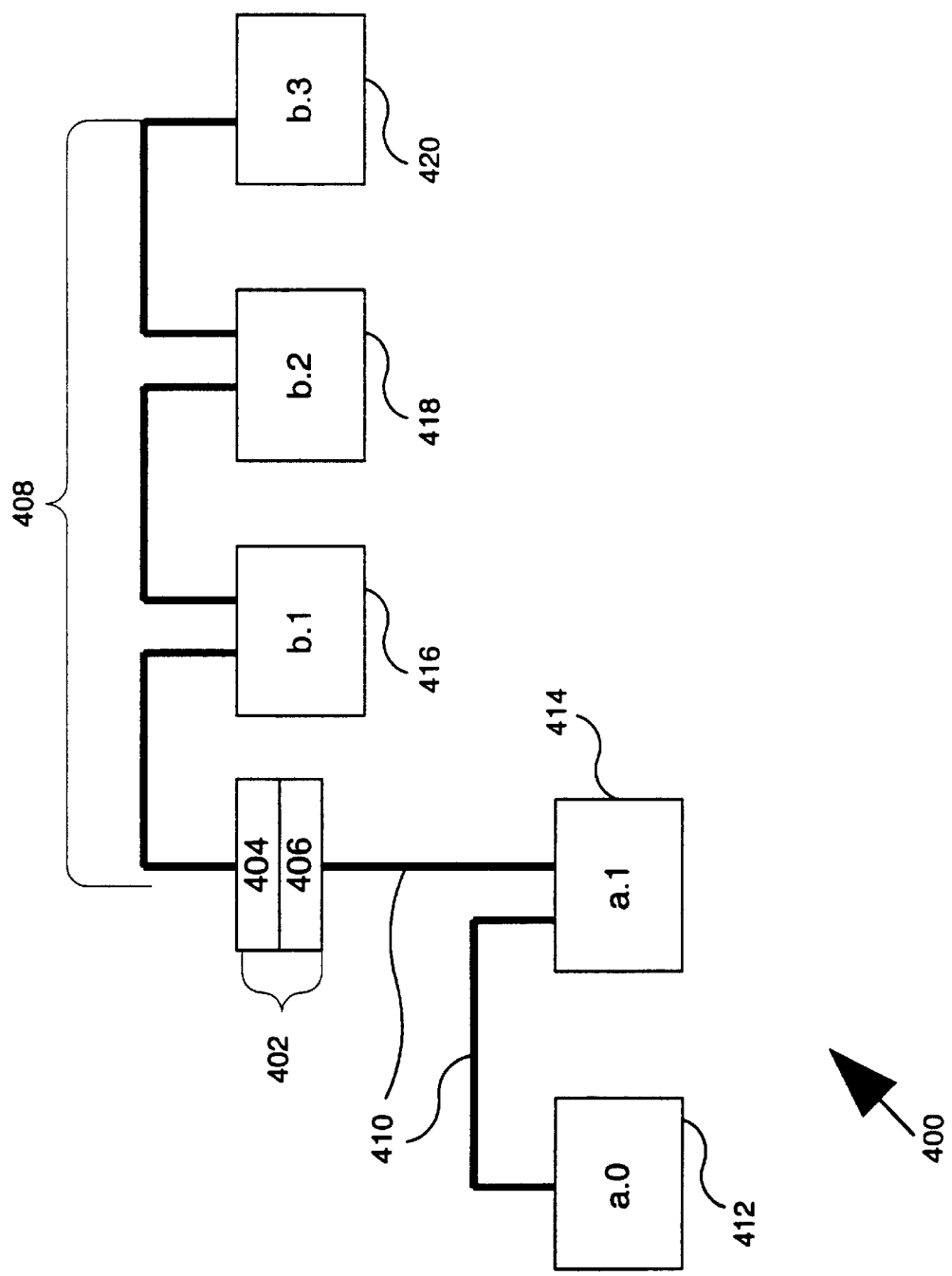
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 416, 418, 420 on a bus 408 and supports multiple bus systems via bus bridge 402.

The control and status register (CSR) architecture, ISO/IEC 13213 (ANSI/IEEE 1212), *Information systems-Control and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
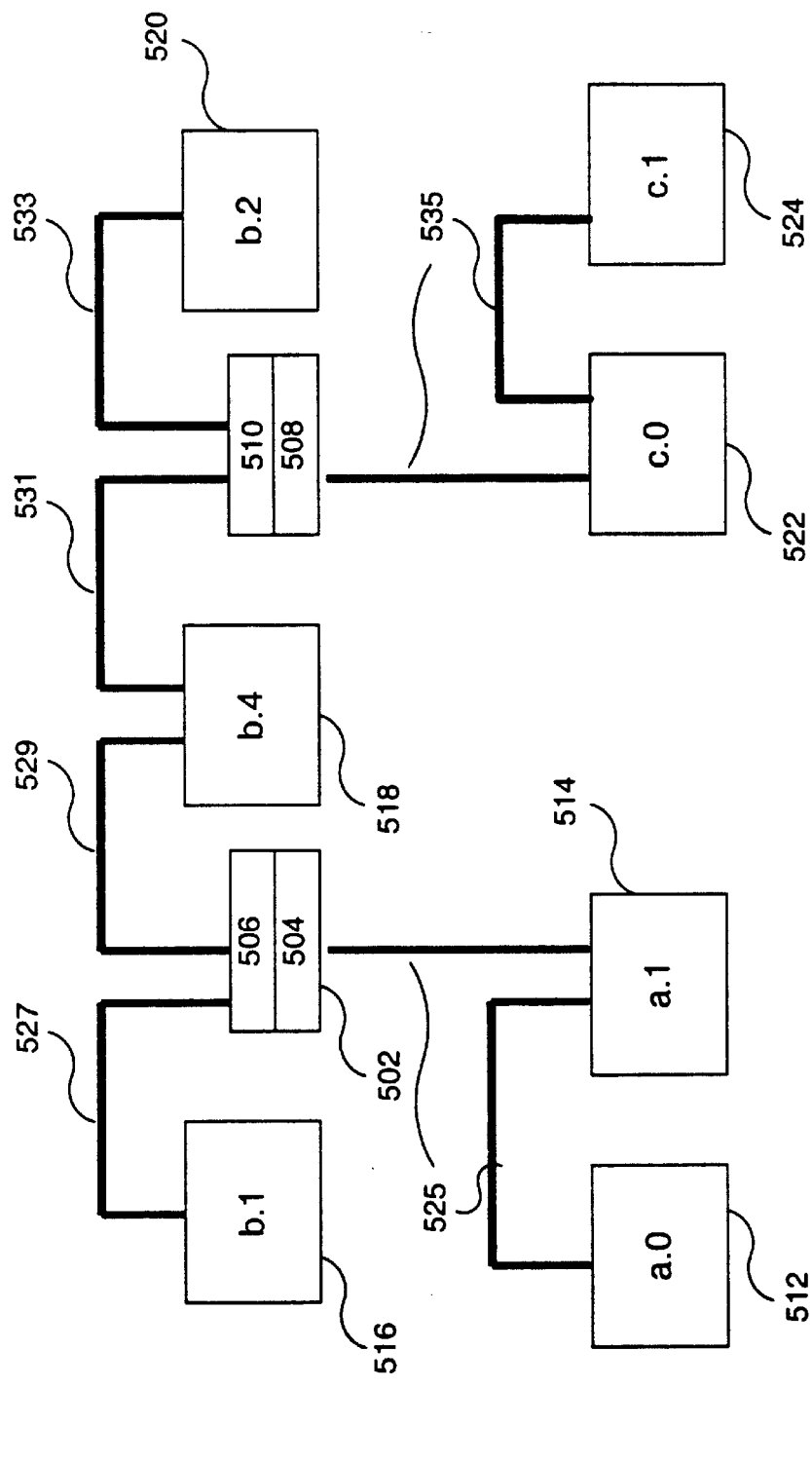
FIG. 4 is a block diagram of one embodiment for a 1394 bus bridge topology.
Figure 5:
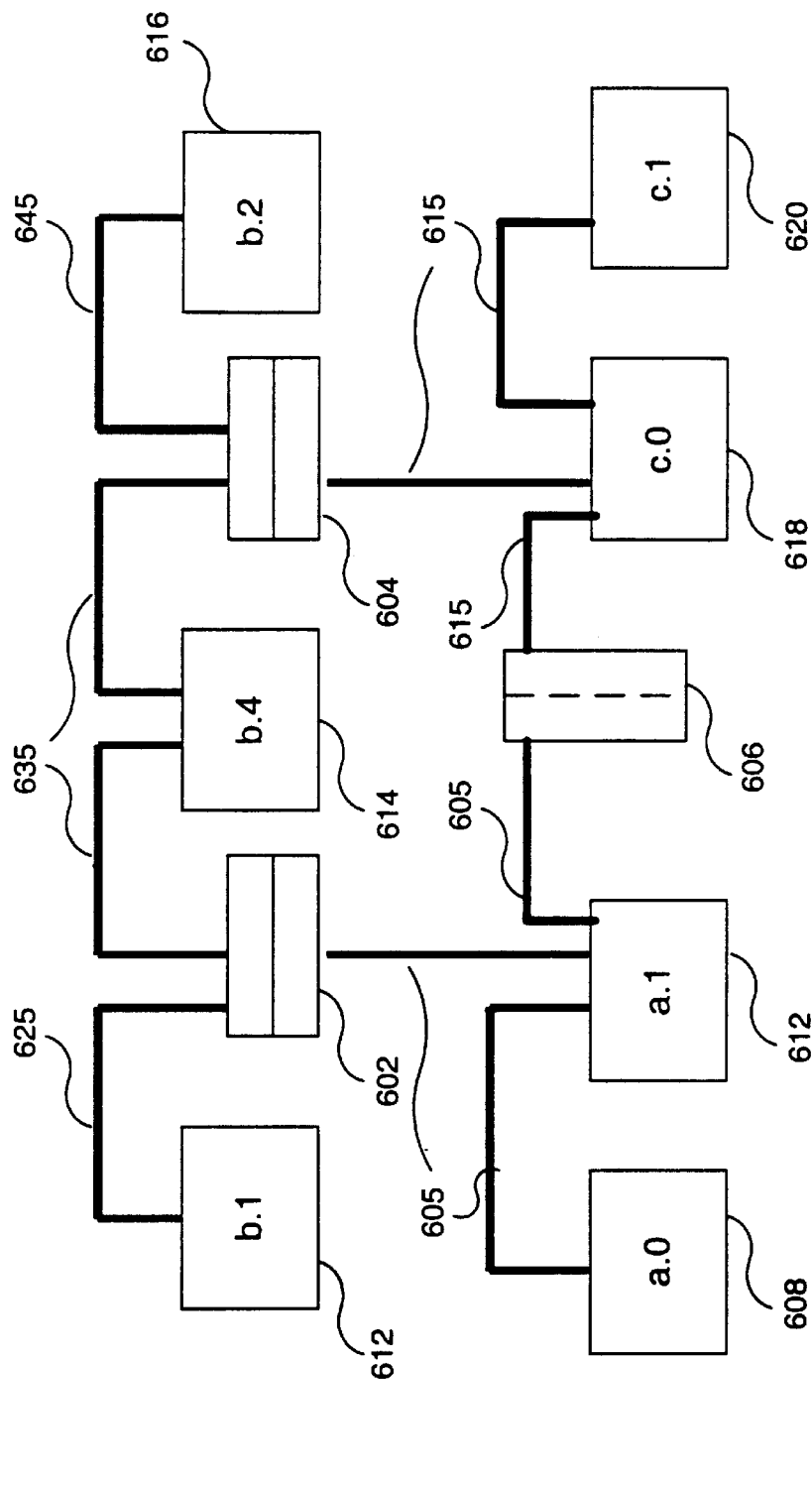
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506,508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

Alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. The bus bridge topology 600 includes portals 602, 604, and nodes 608, 610, 612, 614, 616, 618, 620. The bus bridge topology 600 further includes buses 625, 635, and 645. Referring to FIG. 5, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
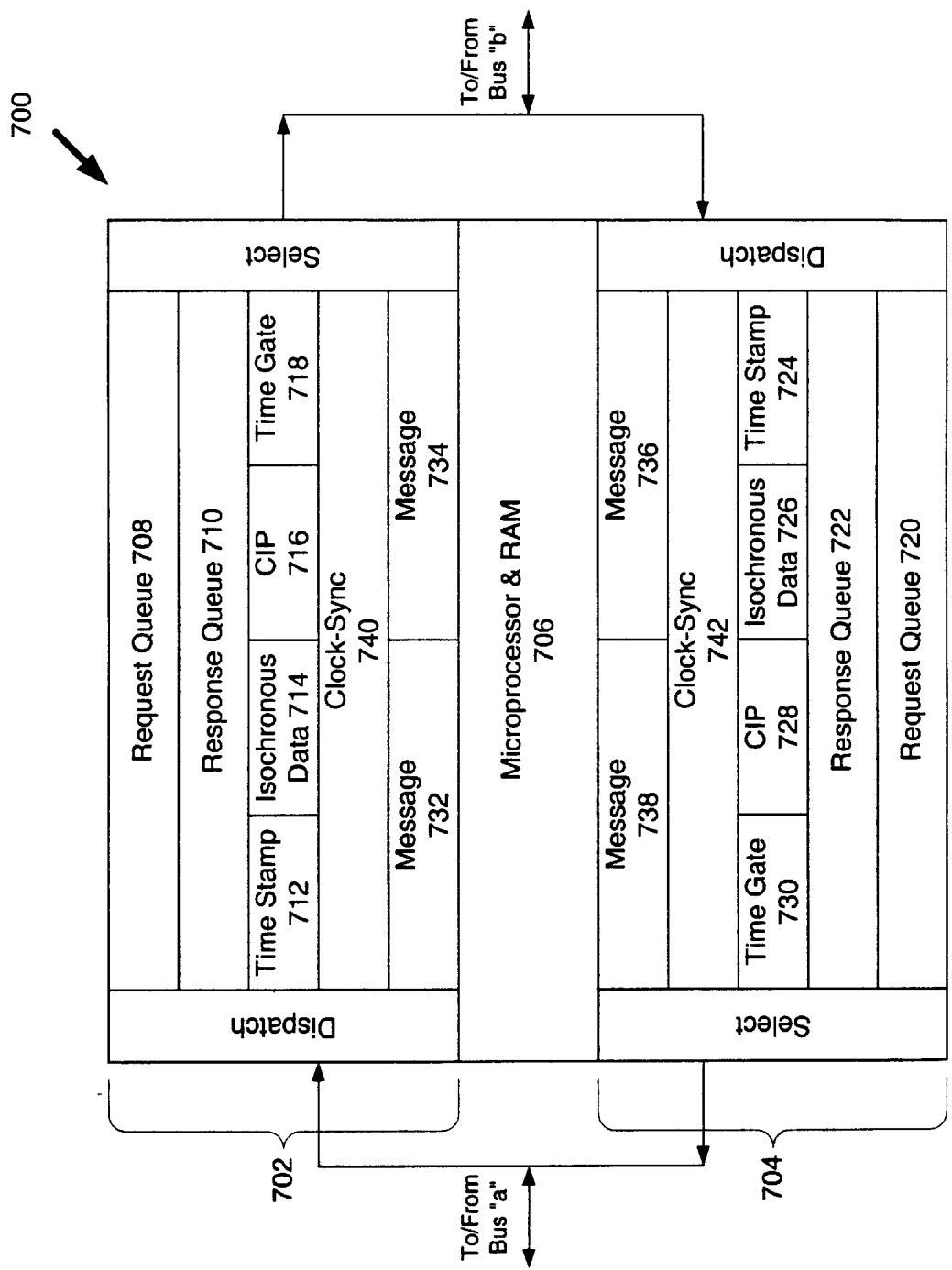
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
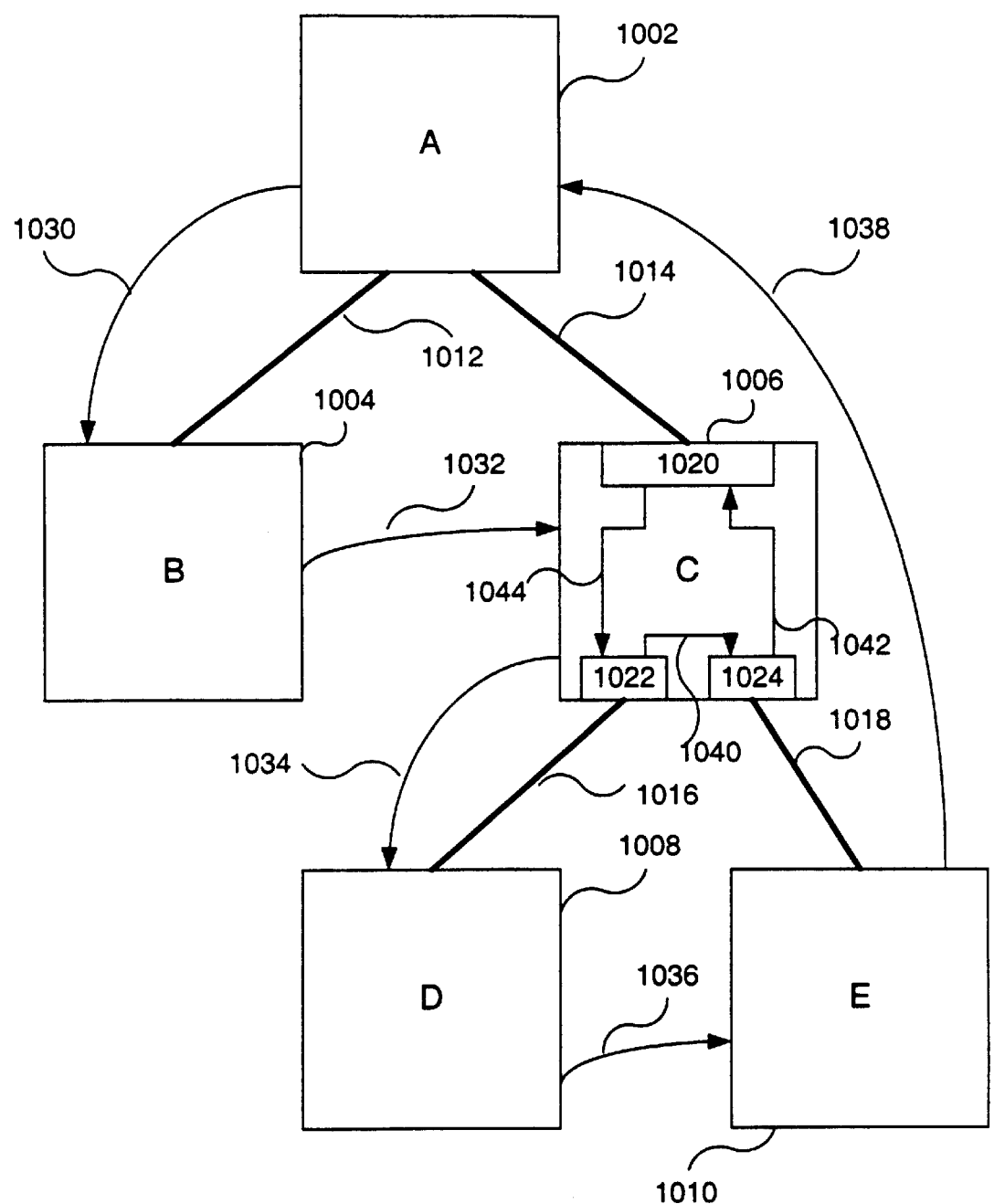
FIG. 7 is a block diagram of one embodiment for a next-neighbor ordering topology.

FIG. 7 is a block diagram of one embodiment for a next-neighbor ordering topology 1000. Referring to FIG. 7, topology 1000 contains a number of nodes 1002, 1004, 1006, 1008, and 1010 connected through respective buses 1012, 1014, 1016, and 1018. Each node 1002–1010 is defined by a relative ring identification (ringID) value made up of the bus identification (busID) and physical identification (phyID) portions. Each node 1002–1010 defines its next neighbor by the relative ringID values in which each node derives the ringID value from the observed self identification (selfID) packets. In one embodiment, a mapping is applied to selfID (packets) in order to arrive at a phyID to ringID mapping. During the self-identify process, each node uniquely identifies itself (selfID), maps its selfID to ringID, and uses its ringID to communicate with its topologically adjacent node.

In one embodiment, the assignment of ringID values is based on a conceptual routing of signals through a node's ports. Using node C 1006 as an example, port[a] 1022 identifies physical port 0, port[b] 1024 identifies physical port 1, and port[c] 1020 identifies physical port 2. Ports 1020–1024 have an implied internal ordering as follows:

port[a].in→port[b].out 1040 port[b].in→port[c].out 1042 port[c].in→counter→port[a].out 1044

In one embodiment, each node 1002–1010 assigns conceptual ringID values to the other nodes, starting with ringID=0 on its own port[a] 1022 output. The ringID values are assigned by logically tracing a path through other physical ports, incrementing the ringID when logically passing through the port[a] 1022 output.

The bus itself defines protocols for sending selfID packets for purposes of assigning unique phyIDs to each of the attached nodes. Although phyIDs are guaranteed to be unique, they are not guaranteed to be the same if the bus is reset again. Thus, there is a need for defining ringIDs which do not change unless the cable topology actually changes.

This assignment strategy always yields the same next-neighbor selections, despite changes in the selected-root assignment or a change in the root node. Thus, in the example shown in FIG. 7, node B 1004 determines that node C 1006 is its next neighbor, node C 1006 determines that node D 1008 is its next neighbor, node D 1008 determines that node E 1010 is its next neighbor, node E 1010 determines that node A 1002 is its next neighbor, and node A 1002 determines that node B 1004 is its next neighbor. The topology, rather than the physical nodes, is traced by following paths 1030, 1032, 1034, 1036, and 1038 from a port to its next neighbor, and any node 1002–1010 may be used as the root.

Figure 8:
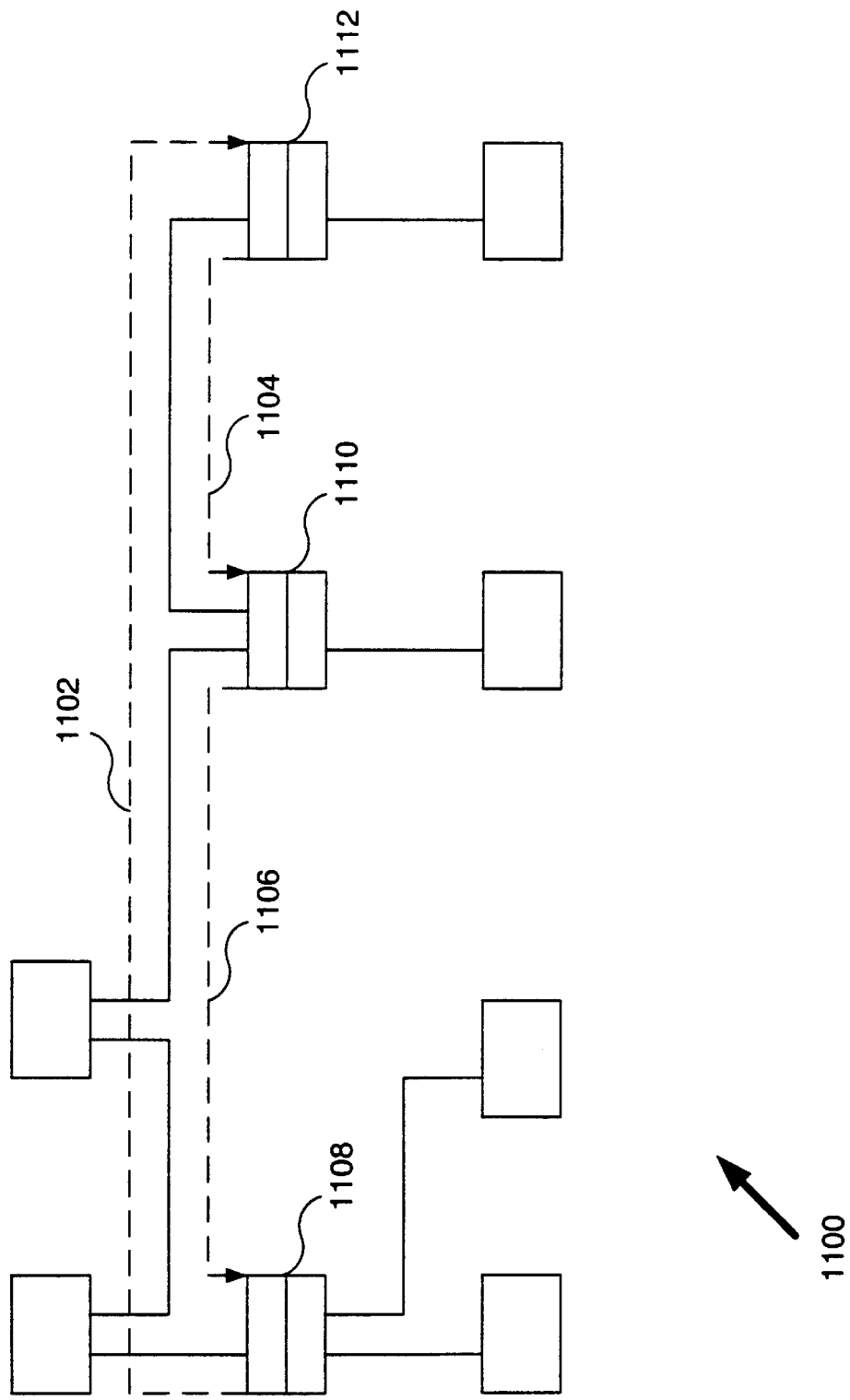
FIG. 8 is a block diagram of one embodiment for a portal-to-portal net refresh message path topology.

FIG. 8 is a block diagram of one embodiment for a portal-to-portal net refresh message path topology 1100. A net refresh is used to assign unique busIDs to each node in the system. Referring to FIG. 8, the communication protocols for net refresh involve the sending of messages from each portal 1108, 1110, 1112 to its neighbor in a daisy-chained fashion. In one embodiment, these responseless write messages are idempotent, so that missing-ack failures may be simply and safely retried (e.g. multiple writes have the same effect as one write).

A net refresh is typically triggered by a bus reset. After the bus reset completes, each portal 1108, 1110, 1112 sends messages to its next neighbor, allowing messages to flow in a circular direction. Thus, the topology-dependent, root-independent portal ordering is available after bus reset. This allows each portal 1108–1112 to circulate messages by sending them in a next-neighbor ordering.

In the example shown in FIG. 8, portal 1108 first sends a message via path 1102 to portal 1112, portal 1112 then sends a message via path 1104 to portal 1110, and finally, portal 1110 sends a message via path 1106 to portal 1108. In this context, "next" means the portal with the next larger ringID assignment.

In one embodiment, a 2-bit precedence is pre-appended to the portal's 64-bit extended unique identifier (EUI) to generate a stable refresh identifier (refreshID). The prime portal's EUI also serves as the context identifier for bridge routing tables. The refreshID allows topology 1000 to specify prime-portal preferences. To coordinate activities when resets occur on multiple buses, a prime portal is selected to coordinate the net refresh activities. In any net, the local-bus portal with the largest refreshID is selected to become the net's prime portal.

Write messages that incur errors or busy indications are immediately retried until successful. Confirmations are provided by allowing these write messages to circulate through other portals until they return to the origin portal. The constant sending of these responseless write messages ensures their successful completion without mandating special fault-retry protocols. The circular nature of the communication allows the originator of these write messages to verify their completion. Such communications are sufficient for reliable broadcasts, but are more flexible because write payloads may be modified as they pass through connected portals.

In one embodiment, a bus reset may occur when a new node is attached to the net. The bus reset has the effect of invalidating the bus ID address contained within the node ID registers of local portals, which effectively isolates them from the remaining portion of the net. A net refresh acquires a new bus number for the reset bus without affecting the busID addresses or routes of other portals.

A net refresh starts with messages sent between local bus bridge portals. A prime-portal is selected to coordinate the net refresh operation. Each node sends acquisition messages to its next neighbor, and these messages initially contain refreshID (a prime-portal selection identifier). Each candidate portal monitors incoming refreshID values and changes to a subservient portal when a larger refreshID is observed. In one embodiment, the largest refreshID value eventually circulates to all local portals, as illustrated by FIG. 8. In alternate embodiments, other refreshID values may be used to determine the prime-portal. The acquisition message supplies the refreshID, as well as a bus Count and portal Count.

The portal Count value in the acquisition messages is incremented when passing through the portals. This ensures the eventual demise of rogue resets, by allowing them to be aged until dead. Reset messages are sent periodically, once each arbitration interval, until the net refresh completes. In the absence of continuous messages, portals time out and attempt to become prime portals.

The net refresh eventually forms a spanning tree by circumscribing the paths through bus bridge portals 1108–1112. Each portal communicates with its adjacent neighbor by writing messages into a standardized control and status register (CSR) location. During the final state of a net refresh, the portal-to-portal messages flow in the direction of paths 1102, 1104, and 1106.

At the conclusion of the net refresh, each node has a net-unique nodeID consisting of busID and localID components. A node's localID equals its phyID. In addition, each portal has a distinctive portal identifier (portalID) that may be used to navigate through the topology.

In one embodiment, a net-changed indication is broadcast to all nodes during a net refresh. As no packets are corrupted if this notification is ignored, the system is not compromised by these unconfirmed broadcast indications. This event notification allows nodes to determine when bus numbers have changed or when audio/video (AV/C) controller reconnections are required. AV/C protocols are used to establish, monitor, and release isochronous connections as required. The net-changed event is bus-local and is sent during net refresh. Since all portals are communicating with others during net refresh, the coordination of these bus-local resets comes out of the net-refresh sequencing. During the net refresh, each of the dominant (prime or alpha) portals is responsible for distributing the net-changed event indication to locally attached secondary portals.

One of the reasons for invoking a net refresh is to resolve inconsistent or ambiguous non-local isochronous resource allocations. The listener and talker proxies assume this obligation, allowing resources to be reclaimed (or lost) in a timely fashion.

A net refresh refers to the sequence of actions that assign busID addresses and establish the bus bridge routing tables. The term net refresh is used because the effects of a net refresh on the bridge portals within the net are similar to, but less disruptive than, the effects of a bus reset on the nodes attached to the bus.

In one embodiment, the net refresh maintains the previous busID assignments, bridge portal routing tables, established isochronous channels, and queued subactions.

A configuring net refresh (often abbreviated as configuring refresh) has the effect of assigning non-conflicting busID addresses to each of the attached buses. When busIDs conflict, either with a currently assigned busID or a DIRTY (previously assigned) busID, new FREE busIDs are assigned.

As an example, a configuring refresh occurs on the surviving portion of a severed net (assuming that a sufficient number of FREE-state busIDs remain).

A cleansing net refresh (often abbreviated as "cleansing refresh") has all of the properties of a configuring refresh and (in addition) initiates the DIRTY-to-FREE recycling of stale busIDs by setting quarantines in each bus-bridge portal. After the quarantines have been set, the portal can recycle DIRTY busIDs after a time delay of $T_{dirt}$. The $T_{dirt}$ value is the maximum time a transaction can remain queued before parsing of the bus bridge.

A cleansing refresh is typically performed when the number of DIRTY busIDs exceeds the number of FREE busIDs. The intent is to recycle the DIRTY busID states, to avoid the invocation of a more disruptive purging net refresh. A net refresh is also invoked on the victim portion of a severed net, to reduce the disruption of survivor subnet buses when the victim and survivor sub-nets are reconnected.

A purging refresh is performed when the number of desired busIDs exceeds the number of FREE busIDs. Although a cleansing refresh would eventually change busIDs from DIRTY-to-FREE, the purging refresh avoids the delay associated with the cleansing-refresh recycling process.

Since bus bridges may have previously-queued transactions with DIRTY-state busID addresses, these queues are purged. This occurs quickly and without timeout-related delays, with the disadvantage of disrupting currently-active transactions.

During the net refresh, nodes communicate the parameters related to in $T_{dirt}$ in net refresh messages so as to compute the worst case values. The maximum number of hops, N, between any requester and any responder is also computed and distributed to portals during net refresh.

Figure 9:
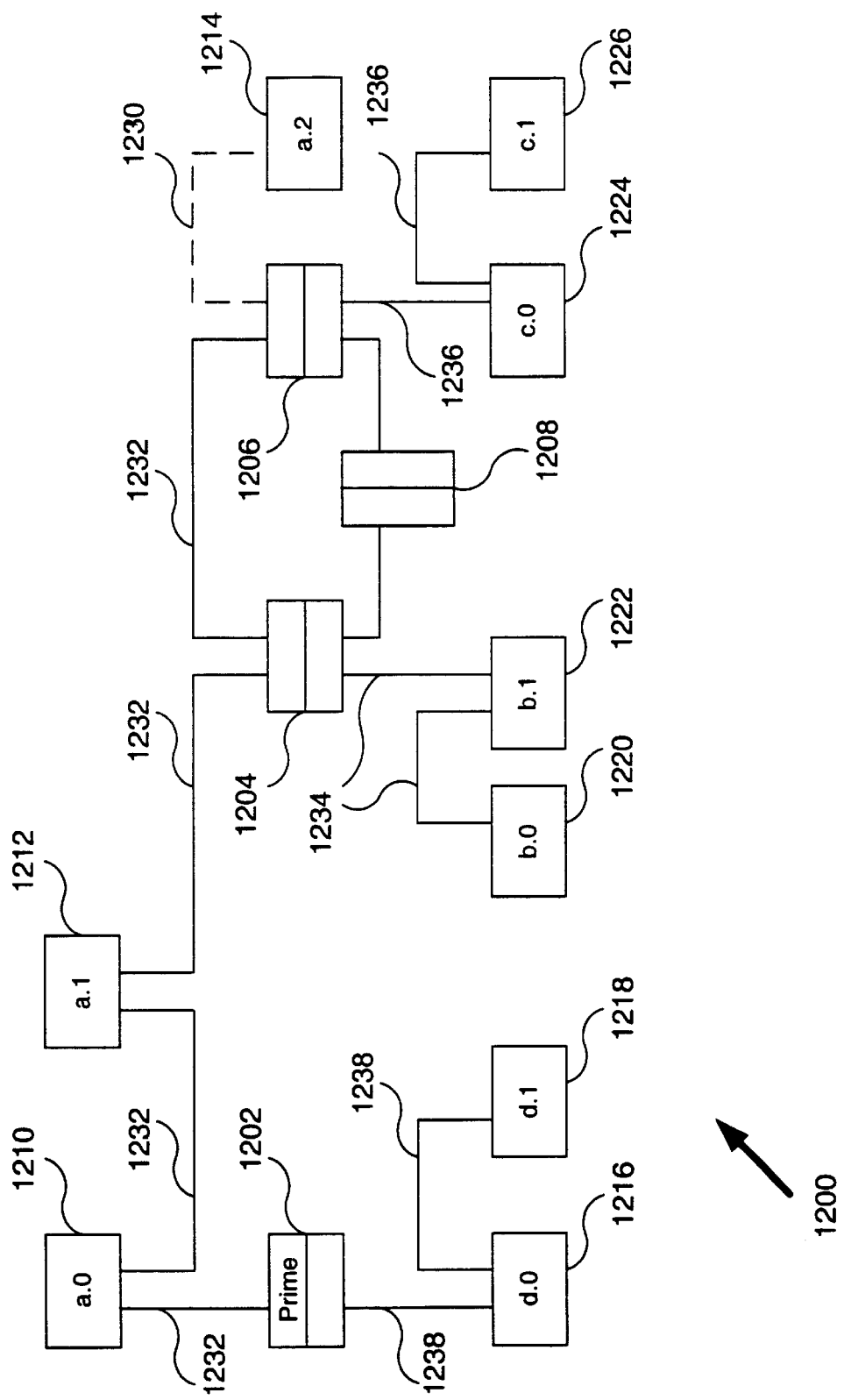
FIG. 9 is a block diagram of one embodiment for a net refresh message path topology during the addition of a node.

FIG. 9 is a block diagram of one embodiment for a net refresh message path topology 1200 during the addition of a node. Referring to FIG. 9, topology 1200 consists of prime portal 1202, alpha portals 1204, 1206, 1208, primary bus 1232, secondary buses (1238, 1234, and 1236), existing nodes (1210, 1212, 1216, 1218, 1220, 1222, 1224, 1226) and a node to be attached 1214.

"Net refresh" refers to the sequence of actions that assigns bus identification addresses and establishes the bus bridge routing tables. The term refresh is used because the effects of a net refresh on the bridge portals in the net are similar to, but less destructive than, the effects of a bus reset on the nodes attached to the bus. Whenever possible, the net refresh maintains the previous bus identification assignments, bridge portal routing tables, establish isochronous channels, and queued sub-actions. A net initialization established the spanning tree as described above for the topology and assigns non-conflicting busIDs.

In one embodiment, three forms of net initialization may be specified: 1) net refresh, which assigns new busIDs, 2) net restart, which is a net refresh plus delayed busID recycling quarantine overhead for recently active requesters, and 3) net reset, which is a net refresh plus immediate busID recycling and transaction termination for currently active transactions. During bus resets, each bridge portal is assumed to be aware of the bridge portal next neighbor with the next larger ringID address as described above. In this embodiment, local daisy chain sequences are possible. For example, portal A sends messages to portal B, portal B sends messages to portal C, and portal C returns messages to portal A.

A net refresh may occur when a new node 1214 is added to the topology 1200 via bus 1230. In one embodiment, a net refresh configures a primary bus 1232 with one primary alpha portal 1202. Other secondary buses (1238, 1234, and 1236) and one alpha portal 1204 are also configured during a net refresh.

Net reset is a multi-phase operation, as discussed in reference to FIGS. 10 and 11 below. In one embodiment, the net reset is accomplished in three stages: the acquire stage, the breach stage, and the commit stage. The initial acquire and breach phases select the prime portal and detect addressing conflicts, while the final commit phase assigns busID assignments, establishes routing tables, and, when necessary, purges asynchronous bridge queues. During the acquire phase, periodic acquisition messages are distributed to other bus local portals. During the breach phase, the acquired portals sequentially extend their acquisitions to adjacent buses. During the commit phase, the prime portal sends commit messages, allowing bus numbers and routing tables to be updated.

Referring to FIG. 9, the addition of node 1214 may invoke a net reset. The net reset invalidates local busID assignments and all reset portals (1202, 1204, and 1206) become prime portal candidates. Each reset portal 1202–1206 attempts to restore its own invalid busID addresses and disables pass-through traffic. In an alternate embodiment, reset portals 1202–1206 may allow local traffic and some amount of pass-through traffic.

During a purging net refresh, topology 1200 is left in a known initial state. Purging refreshes are designed to be robust and timely, which requires them to be more disruptive. The process of initializing net topology 1200 involves formation of a spanning tree by circumscribing the net while passing through bus bridge portals, as illustrated in FIG. 7. For stability, the node with the largest refreshID is selected to become the prime portal (in the examples of FIGS. 10 and 11, it is assumed that portal 1202 becomes the prime portal). The prime portal's extended unique identifier (EUI) is also the basis for the contextID that is distributed among the nodes.

In the discussion that follows, a net refresh is assumed to be initiated by prime portal 1202. However, a purging net refresh may be initiated by any portal. If a purging net refresh is initiated by a non prime portal, the initial net refresh messages would eventually propagate the prime portal, which (due to its larger refresh identifier) would become responsible for completing the net refresh, as discussed below.

Figure 10:
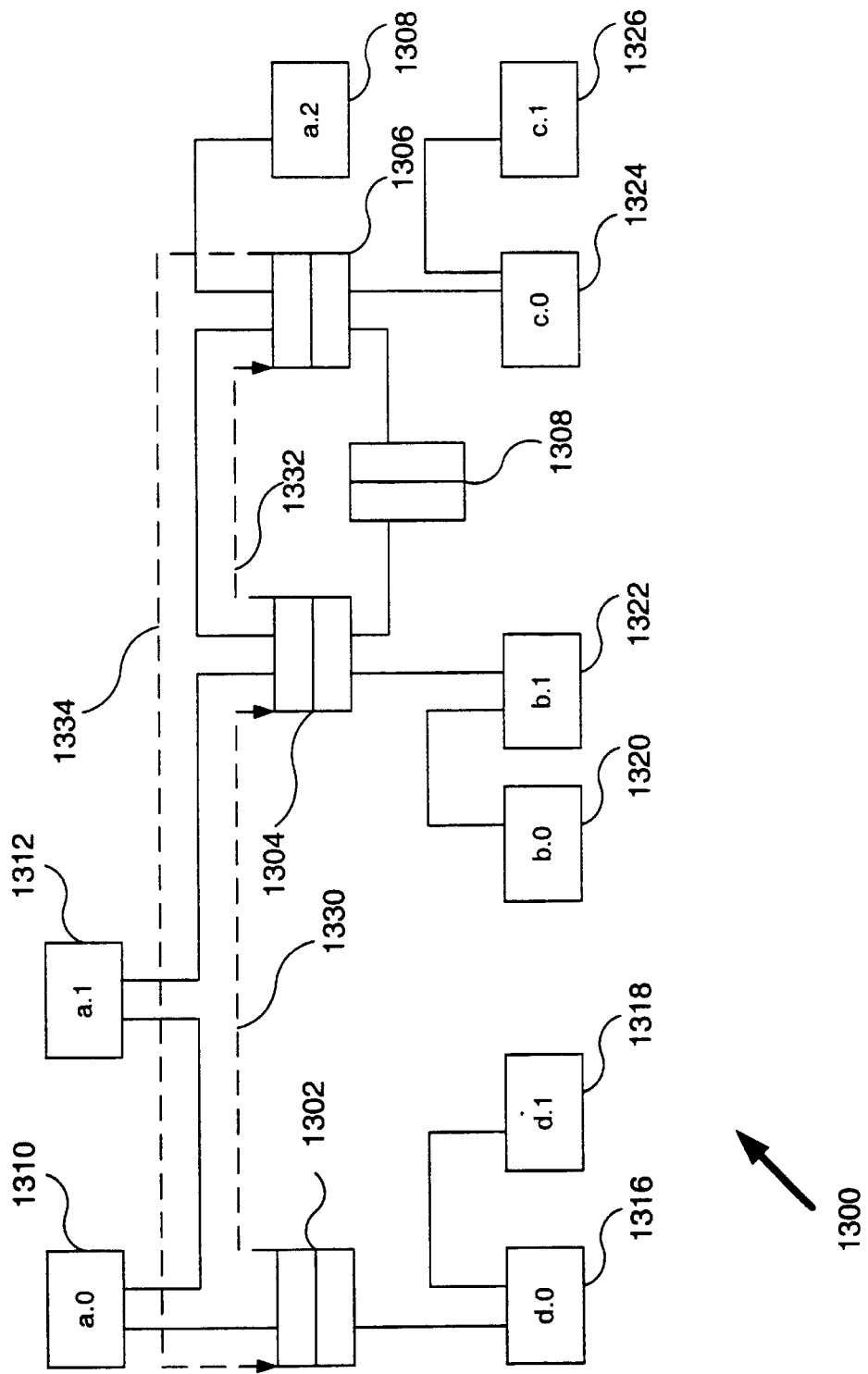
FIGS. 10 and 11 are block diagrams of one embodiment illustrating a purging net refresh.

FIG. 10 is a block diagram of one embodiment illustrating a purging net reset of interconnect 1300. In FIG. 10, the interconnect 1300 includes multiple nodes 1310, 1312, 1316, 1318, 1320, 1322, 1324, and 1326. A net reset may occur when a new node 1314 is attached to interconnect 1300. The net reset has the effect of invalidating portals (1302, 1304, 1306, 1308) nodeID and busID addresses. This has the effect of isolating the portals from external access. In the example of FIG. 10, the net reset on interconnect 1300 is assumed to be initiated by the prime portal 1302. However, all reset bus portals (1302, 1304, 1306, 1308) may act as the prime portal, and the prime portal status is speculative and must be reconfirmed during net refresh (as described in reference to FIG. 7).

A net reset begins with a "reset acquire" message sent between bus bridge portals 1302–1308. The first of these messages is sent from prime portal 1302 and circulates through secondary portals 1304 and 1306 on the primary bus 1342. The message paths are indicated by hash lines 1330, 1332, and 1334, beginning at prime portal 1302.

As discussed above, portalID values in the net reset packets are incremented when passing through the not yet enumerated bus bridge portals (1302–1308). This ensures the eventual demise of rogue resets by allowing them to be "aged until dead." In one embodiment, reset messages are sent periodically, once each arbitration interval, until the net refresh completes. In the absence of a prime portal's resets, other portals may timeout and attempt to become prime portals. Candidate portals (1302–1308) recognize their loss (i.e., not the prime portal) when higher precedence acquire messages are observed, whereupon the portals forward the messages to other portals (next neighbor).

The acquisition of the primary bus completes when the candidate's message returns to the candidate. For example, prime portal 1302 sends a message via 1330 to portal 1304 to acquire bus 1342. The message is passed from portal 1304 via 1332 to portal 1306 and from portal 1306 via 1334 to portal 1302. Once the acquire message returns to portal 1302, portal 1302 acquires its own bus 1342.

Figure 11:
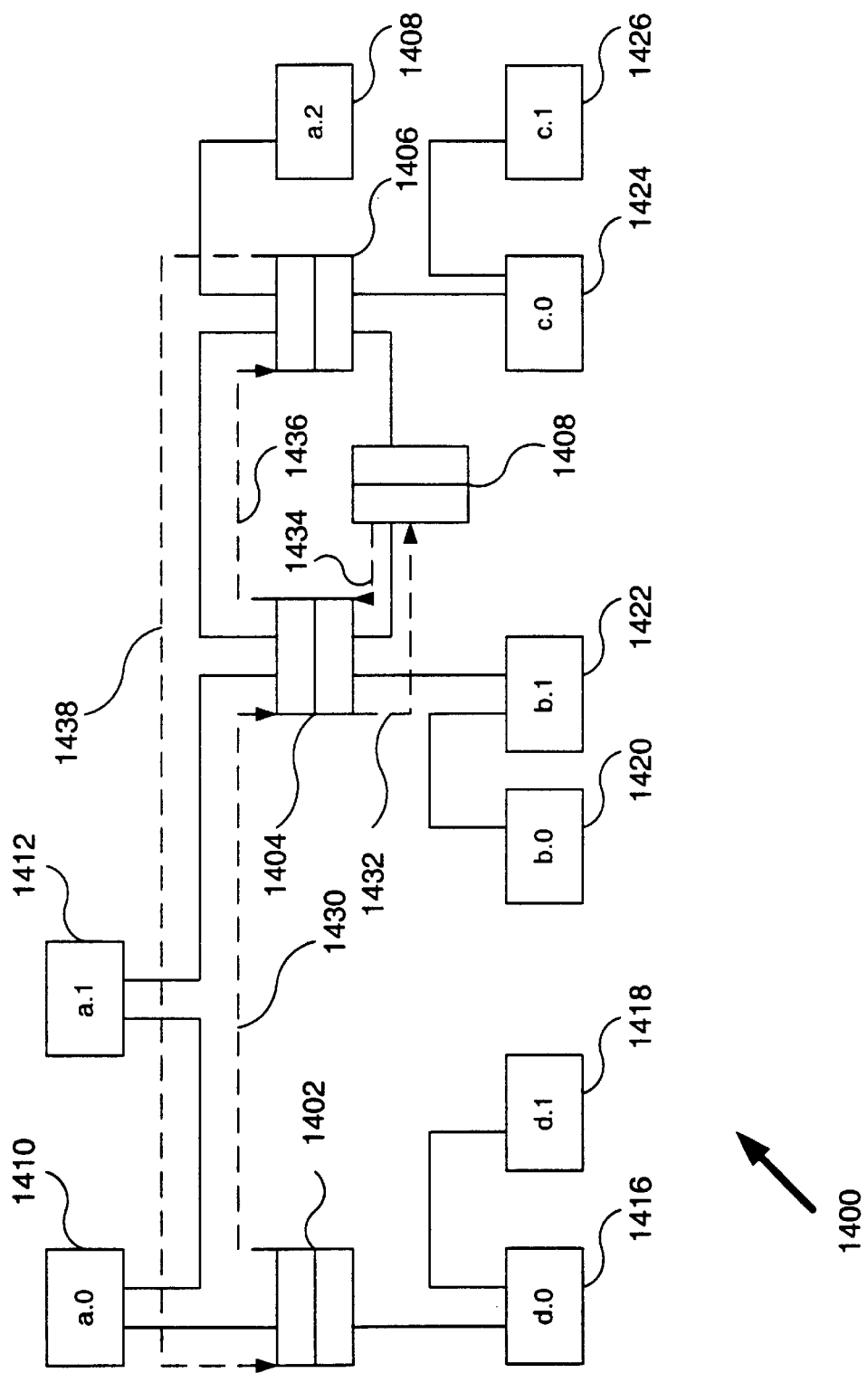

After the primary bus 1342 has been acquired, the prime portal transmits a breach message as illustrated in FIG. 11. In FIG. 11. the interconnect 1400 includes multiple nodes 1410, 1412, 1414, 1416, 1418, 1420, 1422, 1424, 1426, and portals 1402, 1404, 1406, and 1408. Prime portal 1402 transmits a breach message via path 1430 to portal 1404. The receipt of a breach message by portal 1404 causes portal 1404 to breach onto adjacent bus 1444. The breach commands trigger sequential acquisitions of adjacent buses. The reset breach message initiates the acquisition of the first remote bus 1444 as indicated by paths 1432, 1434, 1436, and 1438.

After adjacent buses are acquired, breach packets are sent to initiate a remote bus acquisition. The next portal on the adjacent bus observes the returning reset acquire indication and propagates a reset breach indication to its adjacent bus. That reset acquire circulates and acquires the third bus and subsequent portals. For example, portal 1404 breaches 1408 to acquire bus 1446. The breach messages eventually circulate through all remote buses. The breach messages may reach leaf buses (a leaf bus has no other attached portals) or may close in on themselves when they pass through a bus bridge and discover that the adjacent portal has been acquired by the same candidate portal. The breach messages establish tentative busID assignments and routes; however, these are not activated until the final commit phase. During remote bus acquisition, the breach packets avoid previously acquired buses.

As in the primary bus acquisition, all bus acquisitions complete when the breach messages return to the initiating portal. After the breach is completed, the net knows the addresses that may be reclaimed, which addresses are free, and how many nodes are trying to claim free addresses.

The commit phase begins after the breach packets return bridge routing tables to the initiating prime portal 1402. During the commit phase, the bridge routing tables are updated and the busID assignments are finalized. The commit phase changes the bus bridge paths and opens closed bridges. During the commit phase, all portals receive assignments and routing information. After the commit phase is complete, all blocked portals are released and traffic may commence. Commit packets are sent, initiating the prime portal 1402 and traversing the interconnect topology 1400.

The commit completes when the commit packets return to the prime portal 1402. Normal operation of the net is possible at this time, as the sending of the commit messages stops and the bridges become operational.

Figure 12:
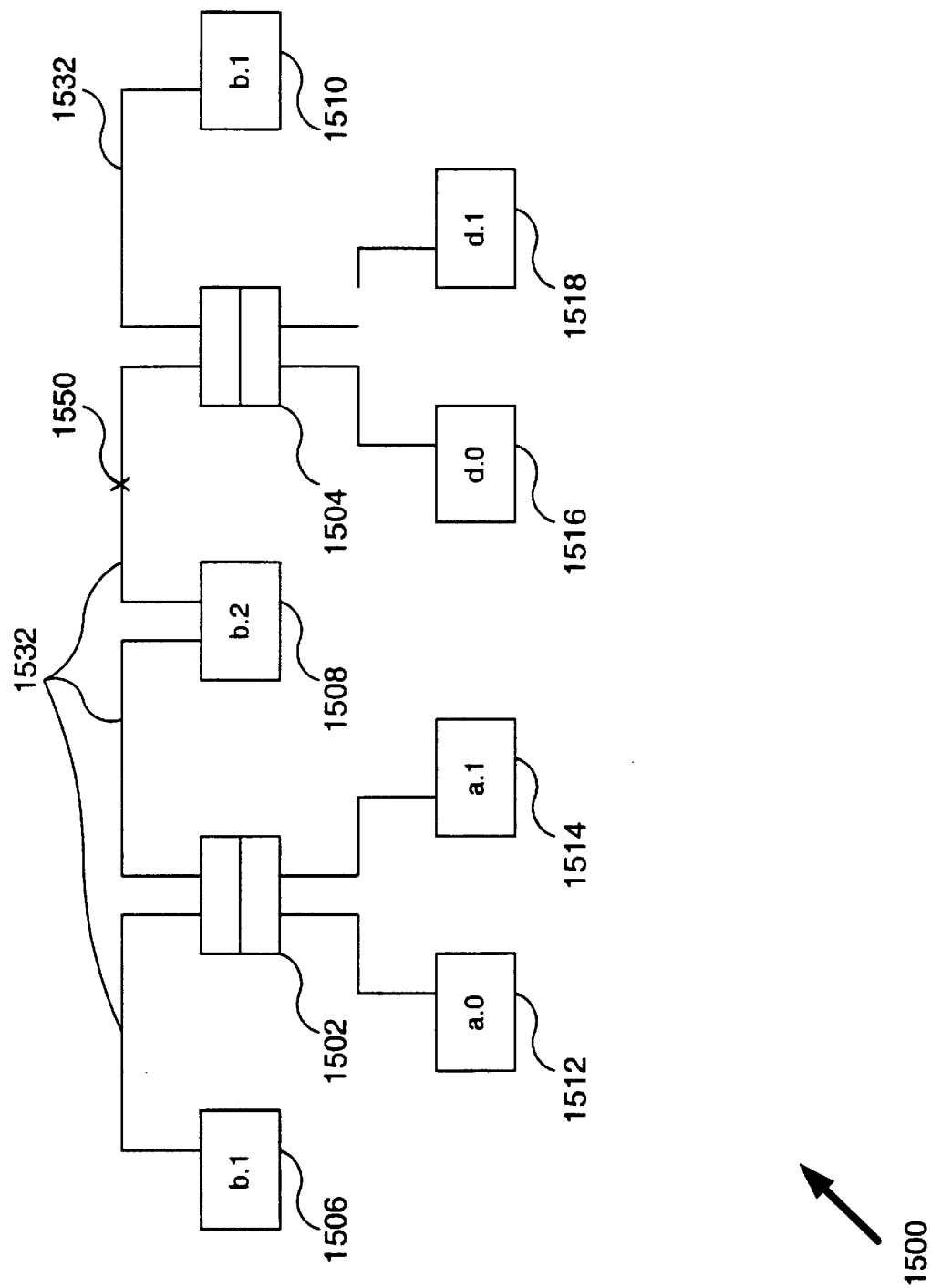
FIGS. 12, 13, and 14 are block diagrams of one embodiment for a secondary bus reset after node detachment.
Figure 13:
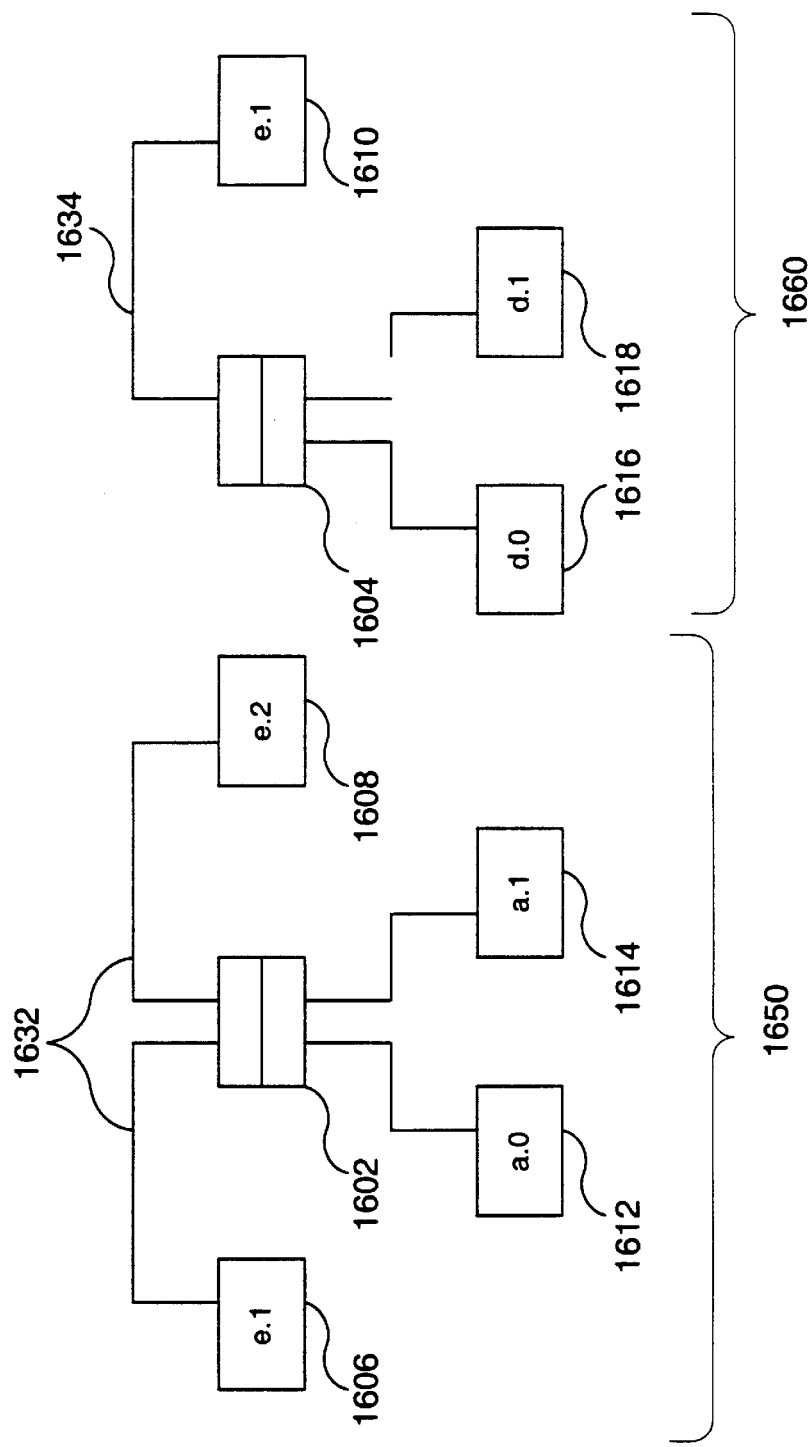
Figure 14:
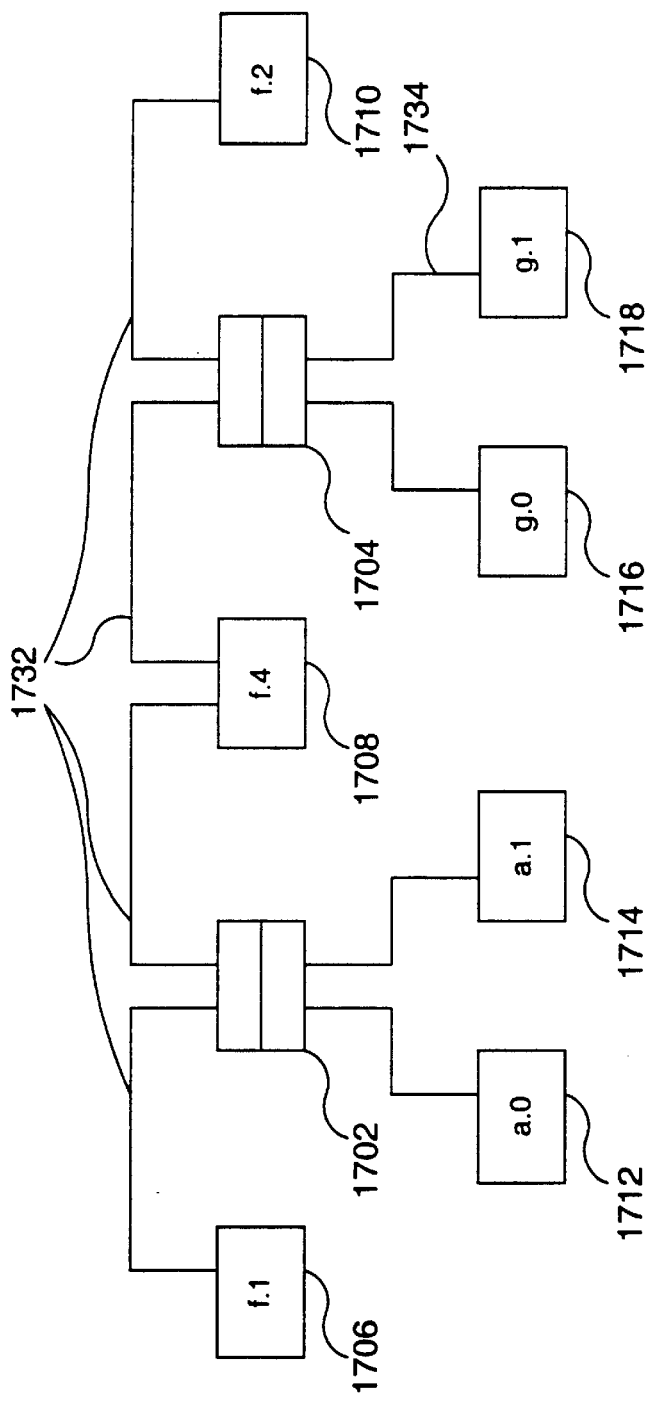

FIGS. 12, 13, and 14 are block diagrams of one embodiment for a secondary bus reset after node detachment.

FIG. 12 is a block diagram illustrating the subnet 1500 prior to this connection. Referring to FIG. 12, subnet 1500 consists of prime portal 1502 and secondary alpha portal 1504. Two subnets may be disconnected during operation of the interconnect by, for example, pulling a cable or detaching a bridge portal. During a disconnection, one subnet is referred to as the survivor subnet and one is referred to as the victim subnet. During a disconnection, both subnets at the disconnection point receive new busIDs.

For example, if a disconnection occurs at point 1550 in FIG. 12, the two surviving subnets are as shown in FIG. 13. The original bus 1532 is shown as buses 1632 and 1634. In this example, it is assumed that subnet 1650 is the survivor subnet and that subnet 1660 is the victim subnet. The nodes 1606 and 1608 on the survivor subnet 1650 receive new busIDs, as indicated by the change of letter in the figure. (For example, node 1506 is changed from "b.1" to "e.1" in node 1606.) In addition, node 1610 receives a new busID. The victim subnet 1660 identification is removed from the tables within the survivor 1650 portal tables. Thus, within survivor subnet 1650 previous busIDs of b, c, and d are invalidated and marked as previously used. Within the victim subnet 1660, the previously used busIDs are marked as invalid in preparation for a reconnect.

During the reconnection of the subnets, new busIDs are assigned within the victim subnet 1660. In addition, a new busID is assigned to the merged reset bus, as illustrated in FIG. 14. Thus, in the example of FIG. 14, new busID F is assigned to the merged bus 1732 and a new busID G is assigned to bus 1734 in the previous victim subnet 1660. Because busIDs B, C, and D were marked as invalid in the prior disconnection, these busIDs are no longer used. In addition, the assigned busID of E that was used in FIG. 13 to indicate the disconnection is also not used during the reconnection process. A new busID F is assigned to the merged, rejoined bus 1732. The survivor subnet 1650 has an unchanged prime portal 1702 identifier (a in the example) and other survivor buses keep their assigned busID addresses. The victim subnet 1660 has a changed prime portal 1704 identifier and other victim buses are assigned new busID addresses, as required.

FIGS. 12, 13, and 14 illustrate one embodiment of a configuring net refresh. A configuring net refresh has the effect of assigning non-conflicting busID addresses to each of the attached buses. When busIDs conflict, either with the currently assigned busID or a dirty, (that is, previously assigned) busID, new free busIDs are assigned.

A cleansing net refresh is similar to a configuring net refresh as the recycling of "dirty" to "free" of stale busIDs by setting quarantines in each bus bridge portal. After the quarantines have been set, the portal may recycle dirty busIDs after a time delay of $T_{dirt}$. The $T_{dirt}$ value is the maximum time a transaction can remain queued before passing into a bus bridge. A cleansing net refresh is performed when the number of dirty busIDs exceeds the number of free busIDs within the busID tables. The cleansing net refresh recycles the dirty busID stage to avoid the invocation of more disruptive purging net refresh. A cleansing net refresh is also invoked on a victim portion of the subnet to reduce the disruption of survivor subnet buses when the victim and survivor subnets are reconnected.

A purging refresh is performed when the number of desired busIDs exceeds the number of free busIDs. Although the cleansing refresh would eventually change busIDs from dirty to free, the purging refresh avoids the delay associated with the cleansing refresh recycling process. Because bus bridges may have previously queued (stale) transactions with dirty busID addresses, these queues are purged during a purging net refresh. This occurs quickly without timeout related delays. However, a purging net refresh disrupts currently active transactions.

When subnets are reattached, as exemplified in FIG. 14, it is necessary to consistently determine which nodes are survivor nodes and which are victim nodes when the two sets of bus addresses are collapsed into one. In one embodiment, the prime portal may determine which portals are on the victim or survivor sub-net. The sub-net which contains the prime portal is the survivor subnet. The sub-net which acquires a new prime portal is called the victim sub-net. The prime portal is defined as the portal with the largest refreshID.

In one embodiment, the refreshID is determined by attaching a two bit preference to the EUI of the portals and using this value to determine the prime portal. The "EUI plus preference" value is transmitted with the net refresh messages from next neighbor to next neighbor and each portal votes on the refreshID value.

In one embodiment, the portal with the largest refreshID value is used as the prime portal. In an alternate embodiment, the portal with the smallest refreshID value may be used as the prime portal. In alternate embodiments, any manner of comparison or arithmetic ordering of EUI values may be used to determine a unique node such as the smallest bit-reversed EUI value or the node with the largest portal ID value.

In one embodiment, the EUI plus preference value is passed through the interconnect. This scheme has two purposes: 1) identify the prime portal to other portals; and (2) allow the prime portal to determine when all others have observed its messages, because only then do the messages return to the prime portal.

Figure 15:
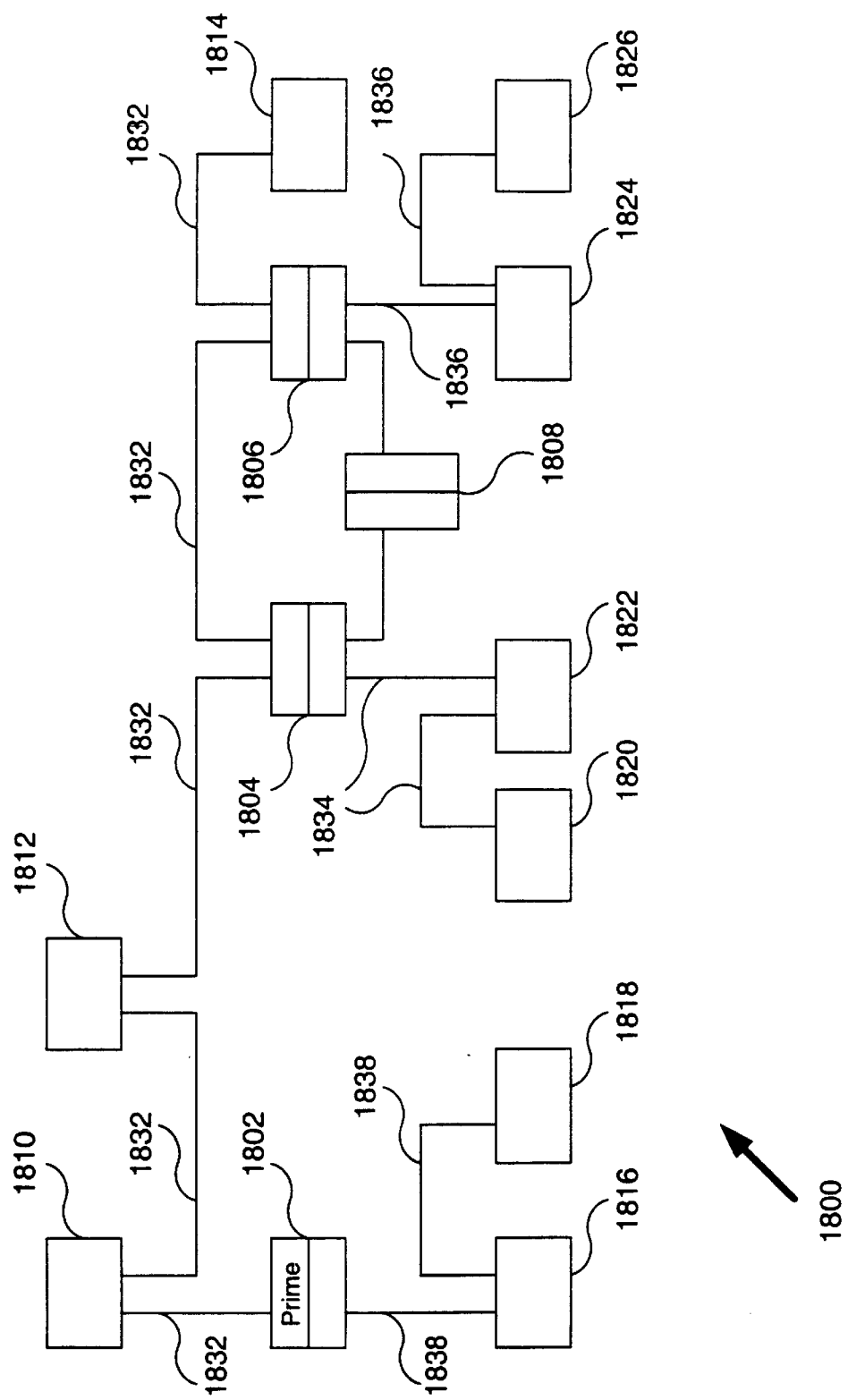
FIG. 15 is a block diagram of one embodiment for an interconnect broadcast topology.

FIG. 15 is a block diagram of one embodiment for an interconnect broadcast topology 1800. A broadcast message may be used after busIDs have changed, for example, when one or more nodes may have been removed, one or more nodes may have been added or the nodeIDs have changed within the interconnect. The broadcast is implemented as two-phase process: first, portals communicate between themselves using directed messages, as described herein, and, second, one of the portals, typically the alpha portal, uses a broadcast transaction to communicate the event to other bus-local nodes. Thus, only bus-local broadcast transactions are required to be sent. This is valuable because the IEEE 1394 standard serial bus defines mechanisms for bus local broadcast but has no provisions for flow controlling these writes based on remote bus loading. Under certain conditions, a bus bridge portal may receive more broadcasts than it can source on an adjacent bus, and some will be discarded. Thus, there is no assurance that normal broadcast transactions can be successfully forwarded through remote buses.

Referring to FIG. 15, any node (1810–1826) may initiate a broadcast message by writing that message to its bus local portal (1802–1808). The bus local portal (1802–1802) forwards this message to the next portal (next neighbor as described in reference to FIG. 7). The next neighbor then passes the message to its next neighbor. The message passing continues from one portal to the next until the message returns to its initial portal, where it is removed. Thus, if prime portal 1802 receives a broadcast from one of its nodes (1816, 1818), the broadcast message is passed to its next neighbor, portal 1804. Portal 1804 then broadcasts the message to portal 1808, which broadcasts the message to portal 1806, which broadcasts the message to portal 1802. Once portal 1802 receives its own broadcast message, the message is removed and dropped.

Each broadcast message generates a broadcast write transaction when it enters a bus through the dominant portal, ensuring one and only one broadcast on each bus. The broadcast messages are implemented as a sequence of directed-write transactions, in which each transaction may be flow controlled. Thus, the broadcast messages are flow controlled and need not be discarded on congested bridges. In addition, the completion of a broadcast message is confirmed when it returns to the initiating portal, and broadcast messages may be used to establish routing paths within the interconnect.

Broadcast messages are designed to be idempotent, so that they may be safely retired once they are returned to the initiating portal. In order to accomplish this, bus bridge portals maintain a copy of the previously received message, discarding the second and following copies after accepting the first. The broadcast message writes are acknowledged, but no response is returned to the sending portal. Because there are no responses that must be distinctly labeled, this allows an identical transaction to be safely and immediately reused after a short acknowledge-missing delay.

To avoid circular dependency deadlocks, one portal in the circular list of portals receives the message in a logical request queue and outputs the message to the next portal on a second logical response queue. Deadlock is avoided by mandating that request queue messages never block the processing of response queue messages.

In one embodiment, a broadcast message may trigger the return of information from multiple nodes. This form of broadcast trigger/collection is referred to as "broadcall" in the backplane environment. Within the interconnect, a broadcall protocol that returns selected node addresses is referred to as address resolution protocol (ARP). In one embodiment, the information received from multiple nodes may be triggered by supplying the EUI of the portal or node as the broadcast message is passed along. Thus, information is appended to the broadcast message as it passes through each portal and finally returns to the initiating portal. As the information passes through each portal, the information may be maintained in tables within the portal for later use.

Figure 16:
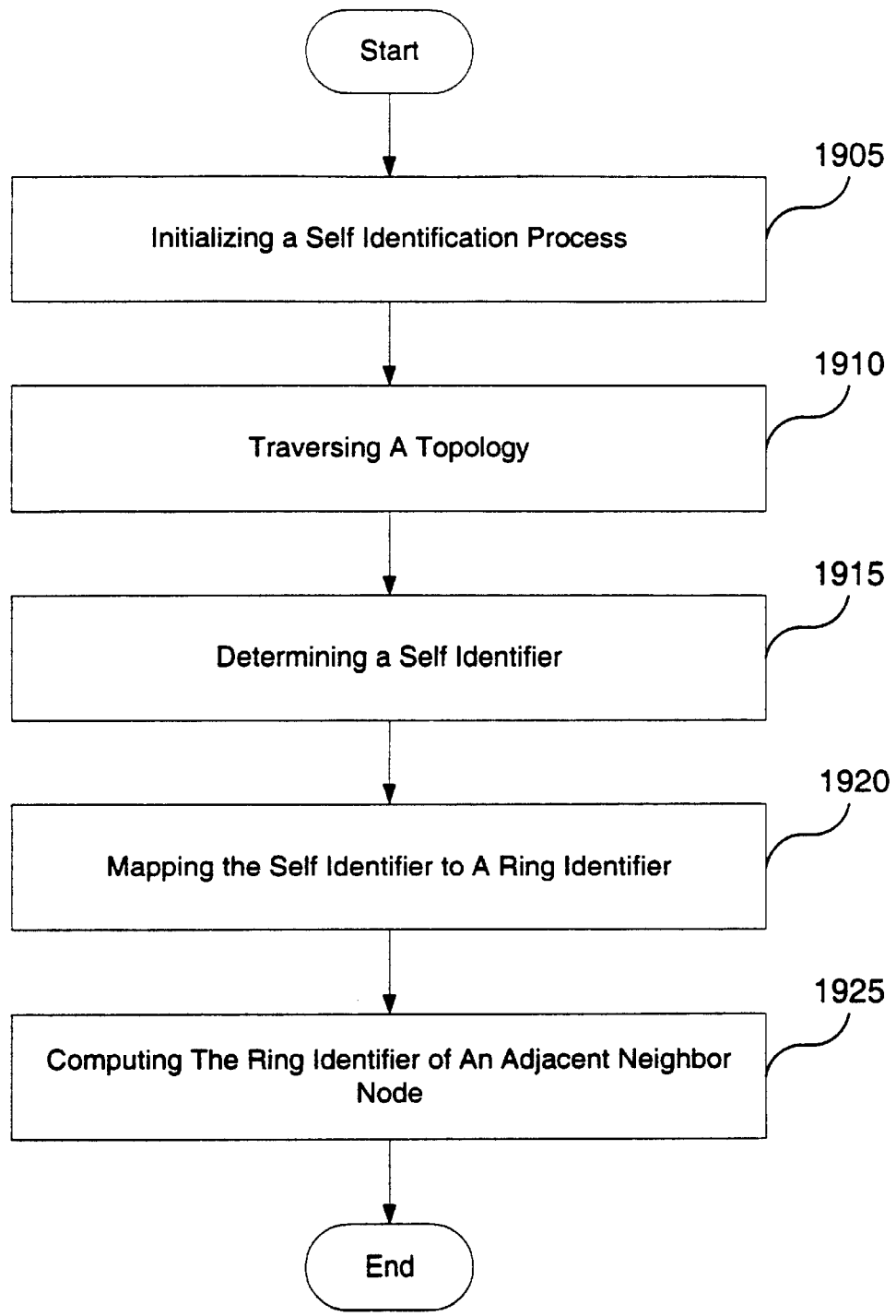
FIG. 16 is a flow diagram of one embodiment for ordering a topology of nodes to form a ring structure.

FIG. 16 is a flow diagram of one embodiment for ordering a topology of nodes to form a ring structure. Initially, at processing block 1905, a self identification process is initialized. The self identification process may be initialized by any node within the topology. Each node sends a self identification grant (selfID grant) to all nodes, beginning with a connected node with the lowest numbered identification. The connected node numbering is based upon the port numbers defined during bus initialization.

At processing block 1910, the topology is traversed by conceptually routing message packets (ringID packets) to at least one physical port of each of the nodes in the topology. Each node sends users its ringID to communicate with its topologically adjacent node.

At processing block 1915, each node determines the ringID of its topologically adjacent neighbor. Each node begins with its own ringID equal to zero on its own port 1022 output. Each node monitors ringID packet transmissions and keeps track of its own ringID.

At processing block 1920, a node the self identifier (selfID) is mapped in order to arrive at a phyID to ringID mapping. Each node is defined by a relative ring identification (ringID) value made up of the bus identification (busID) and physical identification (phyID) portions.

At processing block 1925, each node saves the phyID of its topologically adjacent neighbor node (with the next larger ringID). Each node saves only its own ringID and the ringID of its adjacent neighbor. Thus, each node knows its topologically adjacent neighbor and is able to forward any packets or messages from itself to its next neighbor within the topology.

Figure 17:
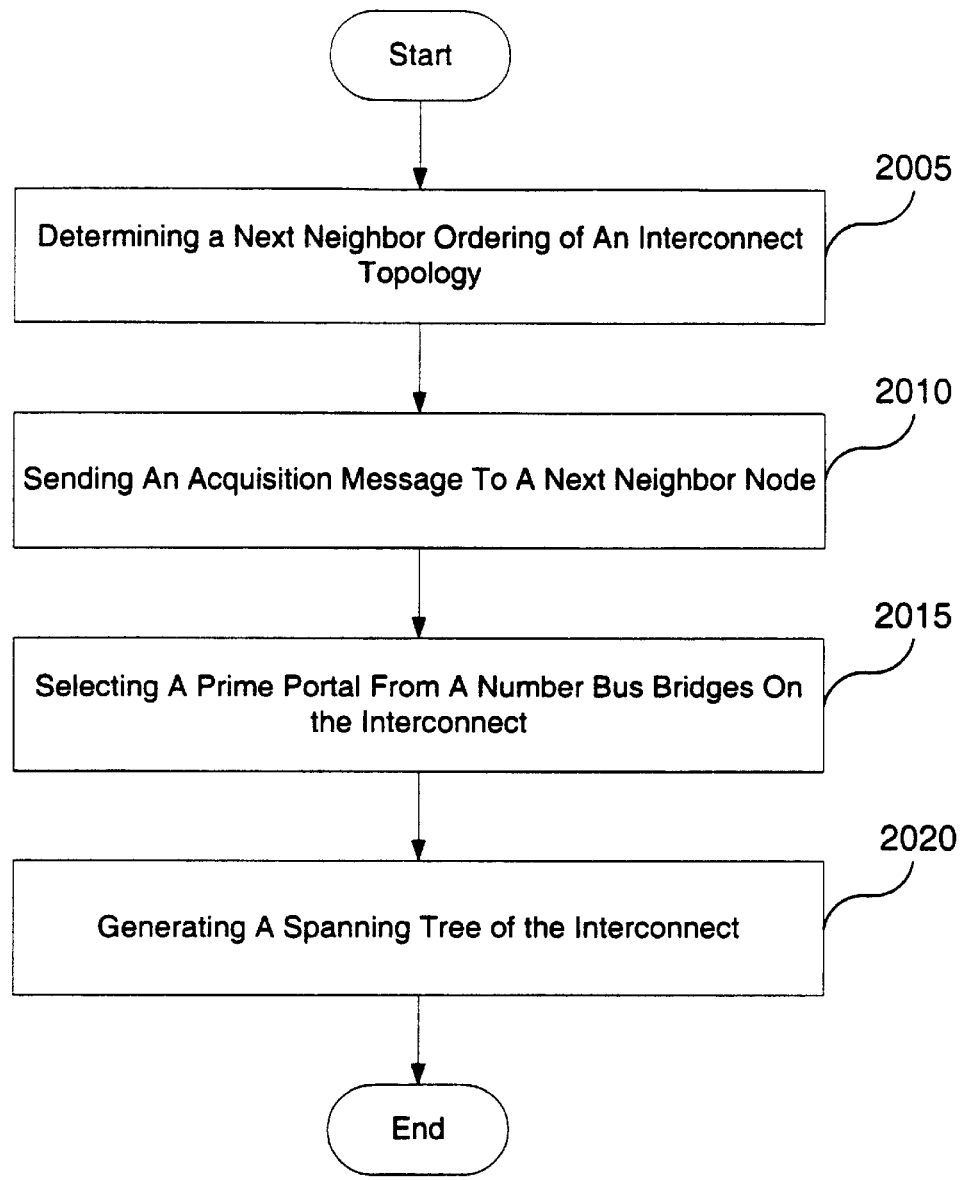
FIG. 17 is a flow diagram of one embodiment for refreshing an interconnect topology.

FIG. 17 is a flow diagram of one embodiment for refreshing an interconnect topology. In this embodiment, the interconnect topology comprises a number of nodes and a number of bus bridges. Initially at processing block 2005, a next neighbor ordering of the interconnect topology is determined as described in reference to FIG. 16.

At processing block 2010, an acquisition message is sent from a node to its next neighbor node. In one embodiment, each node sends the acquisition message to its next neighbor and these messages initially contain a prime portal selection identifier (refreshID). In addition, in one embodiment, the prime portal selection identifier contains a bus count and a portal count. The portal count value in the acquisition message is incremented when passing through each bus bridge.

At processing block 2015, a prime portal is selected from a number of bus bridges on the interconnect. Each bus bridge monitors the refreshID. If the refreshID of the current bus bridge is larger than the incoming refreshID, then the bus bridge overrides the refreshID with its own refreshID. The current bridge passes the new refreshID to its own next neighbor. After the refreshID is passed throughout the topology, the bus bridge with the largest refreshID is selected as the prime portal.

At processing block 2020, a spanning tree of the interconnect is generated. The spanning tree is generated by circumscribing a path from the prime portal through the bus bridges in a daisy-chain manner from next neighbor to next neighbor.

Figure 18:
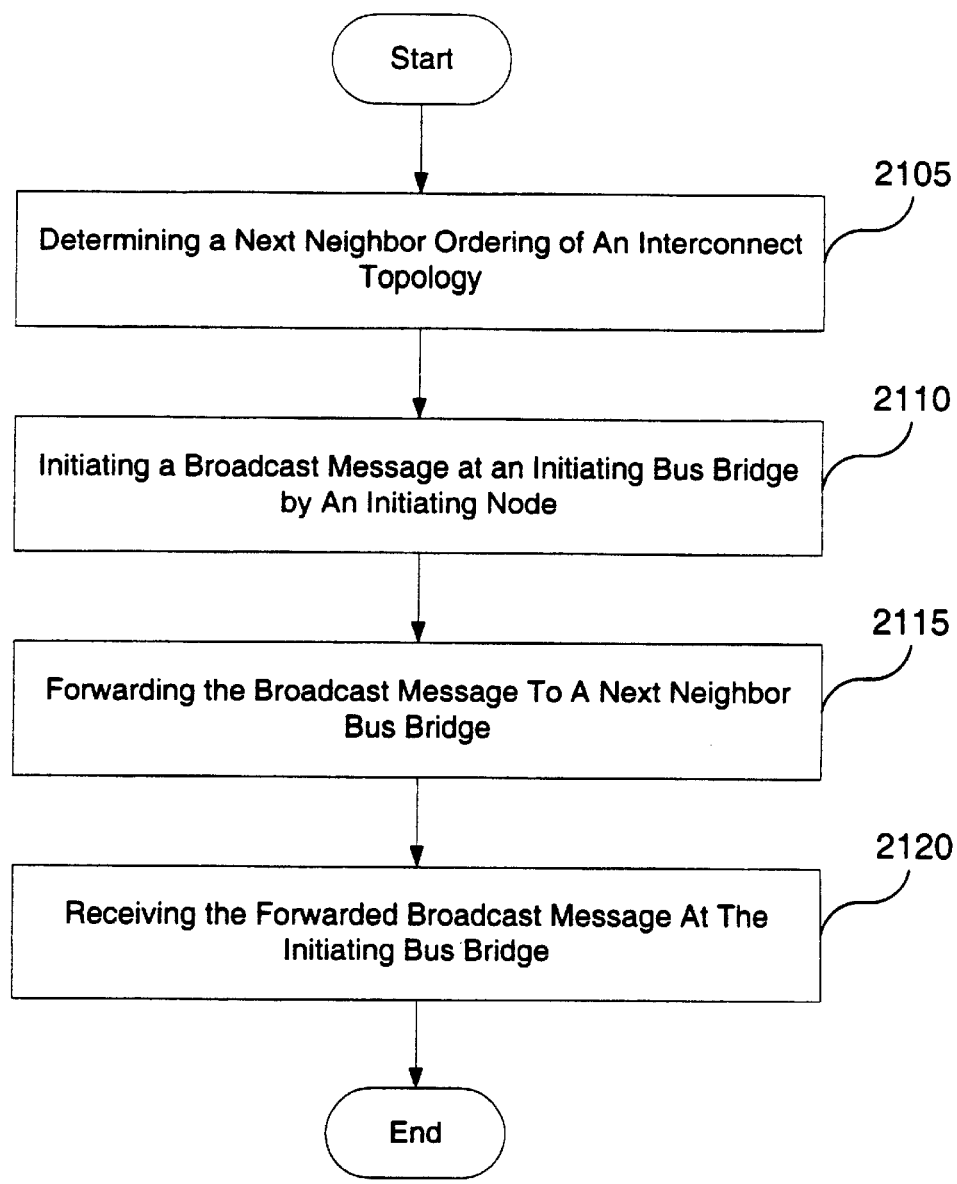
FIG. 18 is a flow diagram of one embodiment for message broadcast flow control on a bus bridge interconnect.

FIG. 18 is a flow diagram of one embodiment for message broadcast flow control on a bus bridge interconnect. Initially at processing block 2105, a next neighbor bus bridge topology is determined as described in reference to FIG. 16.

At processing block 2110, a broadcast message is initiated by an initiating node at an initiating bus bridge. In one embodiment, the broadcast message is initiated by the initiating node sending the broadcast message to its own local bus bridge. Each broadcast message generates a broadcast write transaction when it enters a bus through its own bus bridge. This ensures that only one broadcast message is on each bus at a given time. The broadcast messages are implemented as a sequence of directed write transactions in which each transaction may be flow controlled. Thus the broadcast messages are flow controlled and need not be discarded on congested bridges.

At processing block 2115, the broadcast message is forwarded to a next neighbor bus bridge. Next neighbor processing is described in reference to FIG. 7. The next neighbor bus bridge then passes the broadcast message to its own next neighbor. The message passage continues from one bus bridge to the next until the message returns to its initial bus bridge. In one embodiment, each bus bridge maintains a copy of the received broadcast message and discards a second or subsequent copy of the broadcast message as each is received. All but one bus bridge that receives the broadcast message into a logical request queue sends that message to its adjacent neighbor's request queue; similarly, messages received in the response queue are sent to the adjacent neighbor's response queue. One of the bus bridges takes its received request messages and sends them to the adjacent neighbor's response queue; similarly, messages received in the response queue are discarded. This ensures that the broadcast messages pass through all portals, in a non-deadlocking fashion, before being discarded.

At processing block 2120, the forwarded broadcast message is received back at the initiating bus bridge. In one embodiment, once the initiating bus bridge receives the broadcast message, the message is removed from the system.

In an alternate embodiment, as the broadcast message is received at each bus bridge, each bus bridge appends its own extended unique identifier (EUI) to the broadcast message. The broadcast message is transferred, with the appended EUI, to the next neighbor and finally returns to the initiating bus bridge. Once the appended broadcast message is received at the initiating bus bridge, the initiating bus bridge saves the EUI information of all of the interconnect portals.

Figure 19:
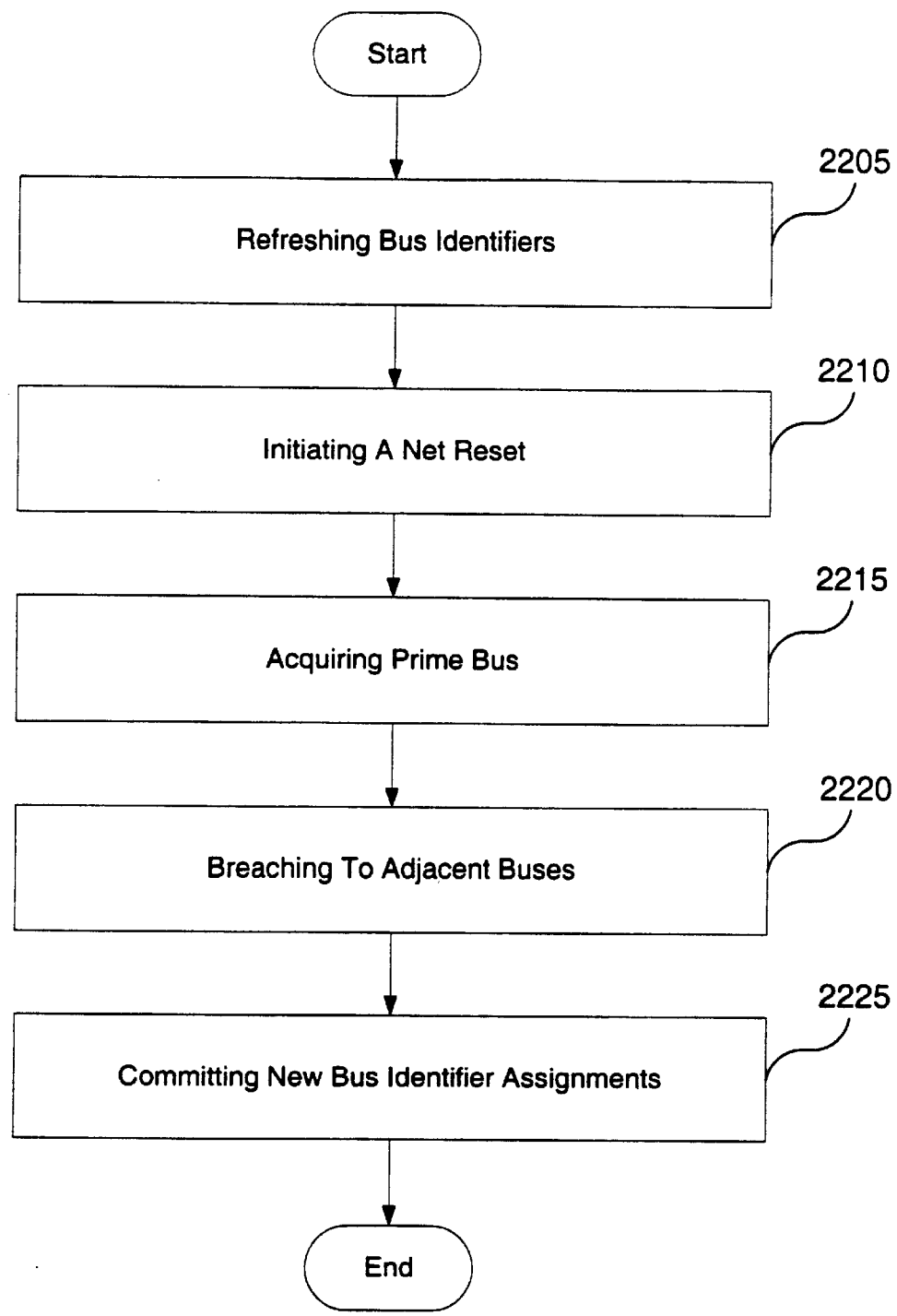
FIG. 19 is a flow diagram of one embodiment for a multi-phase net reset on a bus bridge interconnect.

FIG. 19 is a flow diagram of one embodiment for a multi-phase net reset on a bus bridge interconnect. Initially, at processing block 2205, bus bridge identifiers are refreshed, as described in reference to FIG. 18.

At processing block 2210, a net reset is initiated. The net reset may be initiated by removing a node or subnet of the interconnect or adding a node or subnet to the interconnect.

At processing block 2215, a primary bus is acquired. In one embodiment, the primary bus may be the bus on which the rest is initiated. A bus bridge initially sends a reset acquire message to its next neighbor bus bridge. Next neighbor topologies are described in reference to FIG. 7. The first of these messages is sent from the prime portal and circulates through secondary portals on the primary bus. As each bus bridges receives the acquire message, it determines whether it is a candidate for being the prime portal. In one embodiment, the best prime portal candidate is determined by the highest EUI on the primary bus. After the acquire messages are circulated through the topology, the prime portal is determined. The acquisition of the primary bus completes when the acquire message of the candidate (initiating bus bridge) returns to the portal with the highest EUI.

At processing block 2220, adjacent buses are breached. After the primary bus has been acquired, the prime portal transmits a breach message to its next neighbor. The receipt of the breach message by the receiving portal causes the portal to breach onto an adjacent bus. The breach commands trigger sequential acquisitions of each adjacent bus. The reset breach message initiated by the initiating bus bridge causes the acquisition of the first remote bus. The prime portal acquires all buses adjacent to itself by sending breach messages to each of the attached bus bridges. The next portal on the adjacent bus observes the returning reset acquire indication and propagates a reset breach indication to its adjacent bus. That reset circulates and acquires the subsequent buses.

The breach messages eventually circulate through all remote buses. The breach messages establish tentative busID assignments and routes. However, these tentative assignments are not activated until the commit phase, as discussed below. During remote bus acquisition, the breach packets avoid previously acquired buses. As in the acquiring of the primary bus, all bus acquisitions complete when the breach message returns to the initiating bus bridge portal.

After the breach is completed, the addresses that may be reclaimed, which addresses are free, and how many nodes are trying to claim free addresses are all known.

At processing block 2225, the commit phase of new bus identifier assignments is performed. Breach packets return bridge routing tables to the prime portal. During the commit phase, the bridge routing tables are updated and the busID assignments are finalized. The commit phase changes the bus bridge paths and opens closed bridges. During the commit phase, all portals receive assignments and routing information. Commit packets are sent initiating the prime portal and traverse the interconnect topology. The commit completes when the commit packets return to the prime portal. Normal operation of the net is possible at this time, as the sending of the commit messages stops and the bridges become operational.

Figure 20:
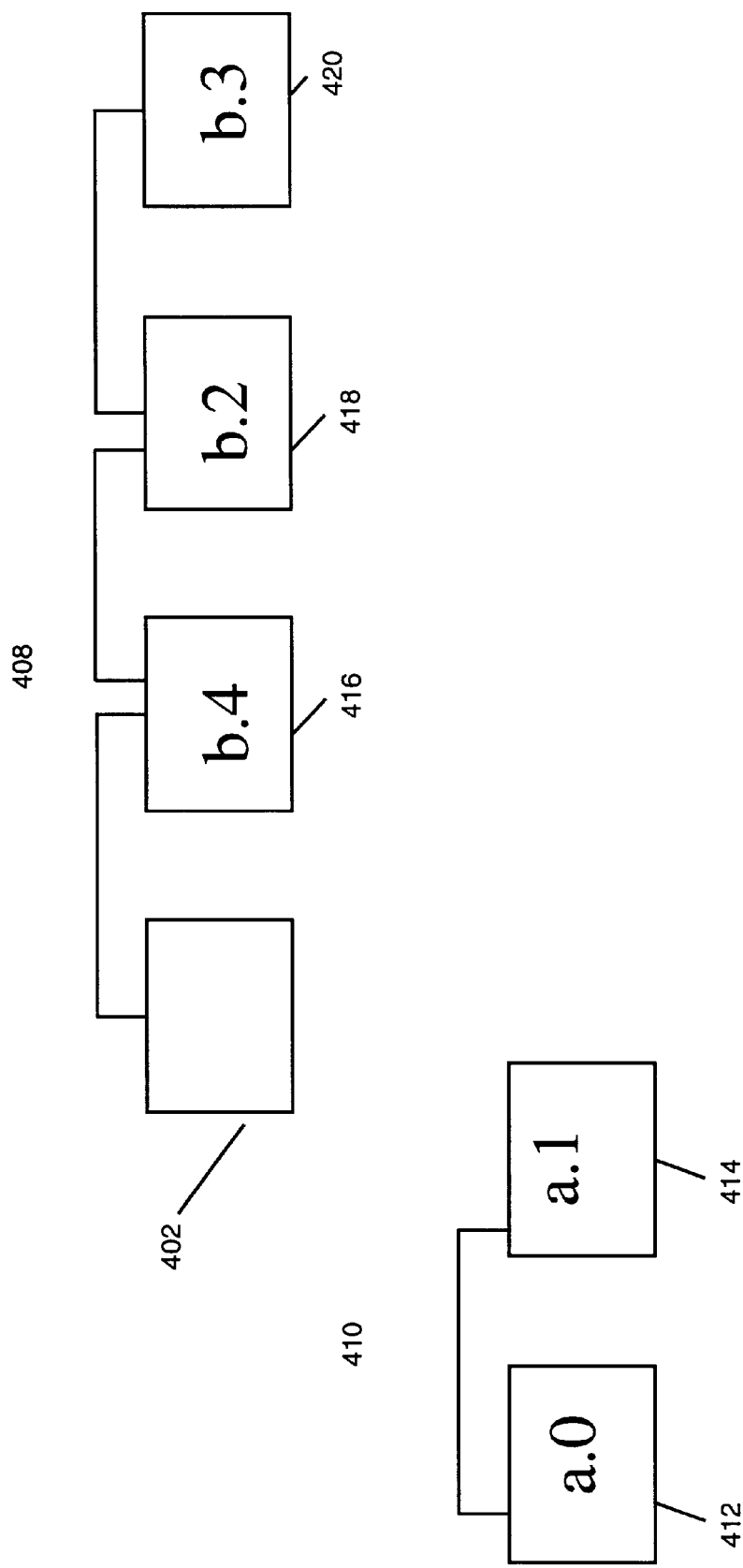
FIG. 20 is a block diagram of one embodiment of two separate buses.

FIG. 20 is a block diagram of one embodiment of two separate buses. As will be appreciated, the topology of a set of interconnected buses may change frequently, and managing such a topology change may prove difficult. For example, referring again to FIG. 4, the buses 408 and 410 may be disconnected. Should a disconnection occur, a new topology may result, such as the embodiment of a set of two unconnected buses illustrated in FIG. 20. Bus bridge 402 and devices 416, 418 and 420 remain connected to bus 408. Devices 412 and 414 remain connected to bus 410. When two buses are disconnected, one may be referred to as a victim and the other as a survivor. In one embodiment, the bus that retains the original prime portal is termed the survivor and the other is termed the victim.

After the change in bus topology, in one embodiment, all devices on the bus are quarantined, the addresses or identifiers previously used to access each device are no longer considered valid automatically. If the bus is a survivor, the devices may retain their original identifiers, but if the bus is a victim, the devices receive new identifiers. In an alternate embodiment, the victim may keep the old identifiers and scrub all other identifiers. Furthermore, any topology resulting in the interconnection of two buses which were unconnected to each other immediately beforehand results in the new bus having to issue new identifiers to each device connected to the bus. This may be implemented in one embodiment as checking whether the victim and the survivor have the same bus identifiers, and then issuing new bus identifiers in each case where that is true. Alternatively, this may be implemented in an embodiment as checking whether the victim has bus identifiers that are dirty for the survivor, and changing the victim bus identifiers if that is true.

Figure 21A:
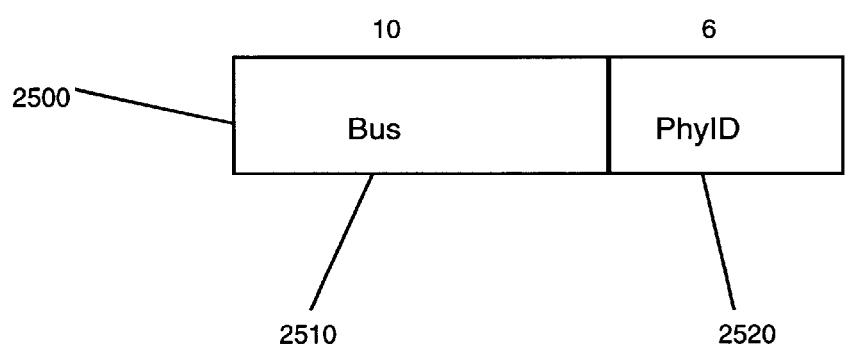
FIG. 21a illustrates an embodiment of an identifier for a device.
Figure 21B:
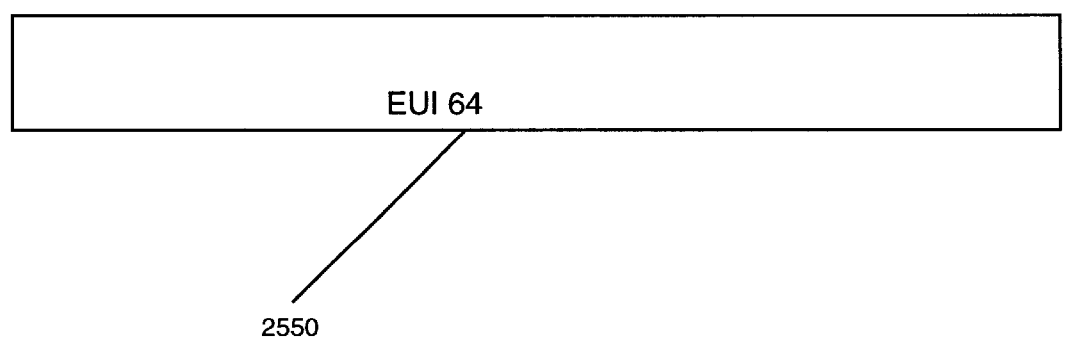
FIG. 21b illustrates an alternate embodiment of an identifier for a device.

In one embodiment, each device connected to the bus may be addressed in two ways. FIG. 21a is a block diagram of an embodiment of an identifier for a device. In a first mode, bus ID 2500 of FIG. 21a illustrates one embodiment of a first address of a device coupled to or connected to a bus. This first address is composed of a bus address identifier (Bus Address) 2510 of 10 bits and a physical address identifier (Physical ID) 2520 of 6 bits in one embodiment. FIG. 21b is a block diagram of an alternate embodiment of an identifier for a device. In a second mode, each device may be identified using a EUI 64 ID 2550, which is a unique 64 bit identifier.

Figure 22:
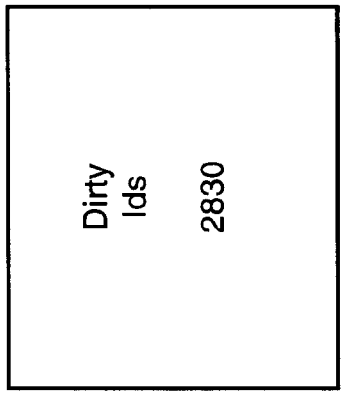
FIG. 22 is a block diagram of one embodiment of pools of identifiers for devices.
Figure 22:
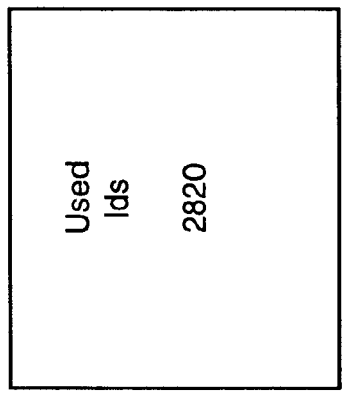
Figure 22:
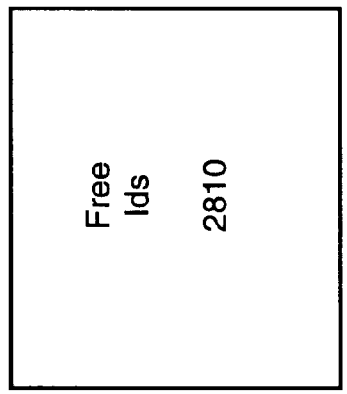

FIG. 22 is a block diagram of one embodiment of pools of bus ID 2500 identifiers for devices. Bus IDs 2500 may be maintained in one of three pools of bus IDs 2500. These pools include a free ID pool 2810, a used ID pool 2820 and a dirty ID pool 2830. Available bus IDs 2500 are maintained in the free ID pool 2810. When a bus ID 2500 is used or assigned, it is moved to the used ID pool 2820. When the bus ID 2500 is used or assigned, it may be seen as used and requiring forwarding of the packets directed to it to another bridge, or as used and accessible through the bridge in question. Finally, when a previously valid bus ID 2500 (one that has already been used) is no longer used (such as due to a potential or actual conflict), it is moved to the dirty ID pool 2830. When a bus ID 2500 is needed for a device, it is drawn from the free ID pool 2810 and both assigned to the device and moved to the used ID pool 2820. It will be appreciated that this may result in depletion of bus IDs 2500 within the free ID pool 2810, to the point that new bus IDs 2500 may not be assigned.

Bus IDs 2500 are stored in each portal, and even though a given portal may not have a conflict with another portal over a bus ID 2500, the conflict information is still stored in the portal if two other portals have a conflict. Thus, each portal has an image of the overall net topology, and when a break occurs, the victim and survivor can be expected to start with similar images of the net. Furthermore, the portals utilize some of the bus ID 2500 information to route the packets along the net. While the bus IDs 2500 may be thought of as stored in pools, in one embodiment, the bus IDs 2500 each have associated with them an indicator of what state or which pool the bus ID 2500 is in. The indicator, in one embodiment, is a set of two bits which encode one of four states: free, dirty, valid and forwarded through another bridge, or valid and forwarded through this bridge or portal. Moreover, when a selected portal on the bus observes a request to access a bus ID 2500 which the portal shows as a free or dirty id, the portal may be expected to reject the request as addressed to a bad identifier in one embodiment.

In one embodiment of a net cleanse, a quarantine applies to each device on a local bus. When the device attempts to reach a device through the bus bridge or portal, the transaction is rejected as quarantined. The device may then be expected to assume that the address or bus ID 2500 it used may be stale, and to attempt to rediscover the bus ID 2500 for the device it is attempting to reach. In one embodiment, this includes the device scrubbing its internal EUI 64 ID 2550 to bus ID 2500 tables, whereas in an alternate embodiment, such a table has its entries marked as suspect. If the table is scrubbed, the device may rediscover the bus IDs 2500 of any EUI 64-identified devices it will need. If the table is marked as suspect, each bus ID 2500 in the table may be tested, by requesting the EUI 64 ID 2550 for the bus ID 2500 to determine if there is a match. Bus IDs 2500 that still match the corresponding EUI 64 ID 2550 may be marked as valid, and other bus IDs 2500 may be rediscovered based on the EUI 64 ID 2550 of the desired device. Since many devices may be expected to work with only a few other devices, re-verification of nodes ids 2500 and rediscovery may be accomplished quickly.

Figure 23:
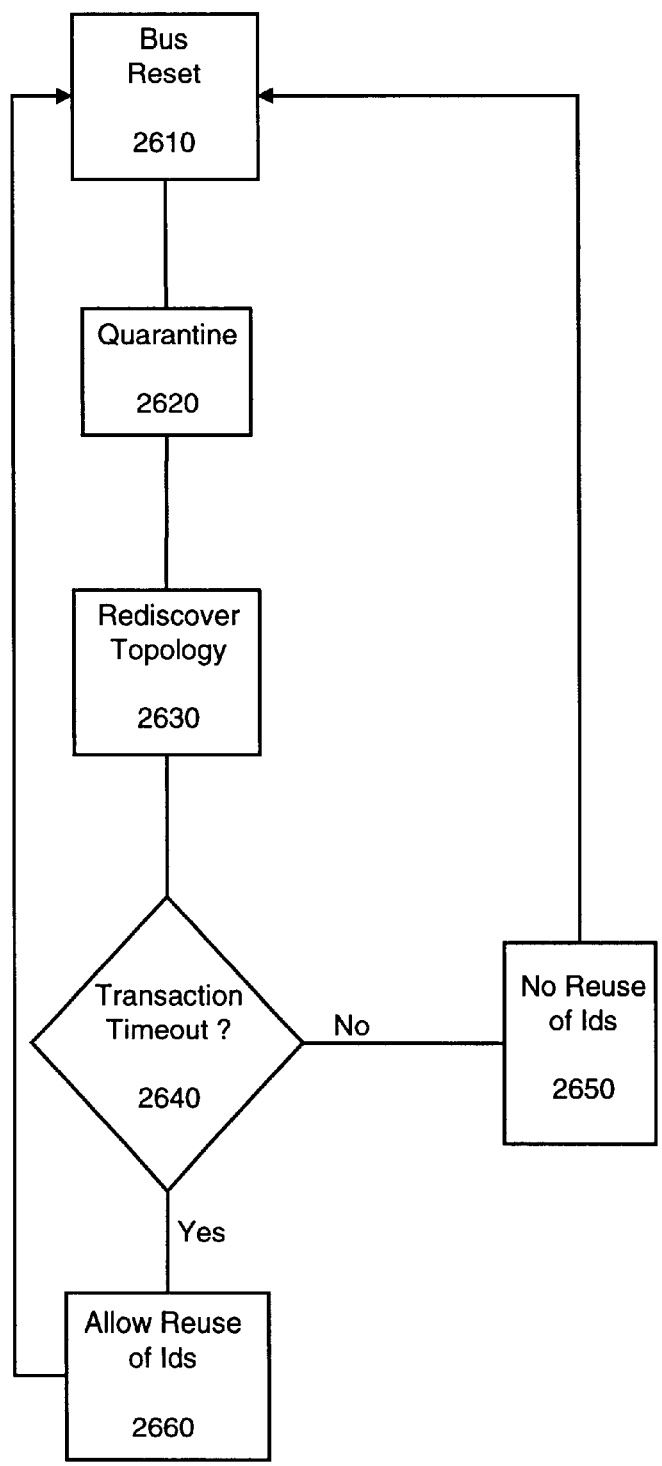
FIG. 23 is a flow diagram of one embodiment of a process for handling quarantine during a bus topology change.

FIG. 23 is a flow diagram of one embodiment of a process for handling quarantine during a bus topology change. It will be appreciated that a bus reset may occur for a variety of reasons, but in one embodiment, any topology change will result in a bus reset. However, it will also be appreciated that an indication of a change in bus topology may be accomplished by a separate dedicated signal, rather than using a reset signal.

Initially, at block 2610, a bus reset is initiated. At block 2620, in one embodiment, all devices within the interconnect are quarantined. In one embodiment, this quarantine is indicated by a bit or bits set in the bus bridges which correspond to each device on the local bus that might access the bus bridge. These quarantine bits are associated with the bus ID 2500 maintained for each device, such as the bus ID 2500 illustrated in FIG. 21a. Thus, quarantining the devices results when the appropriate bit or bits are set. In an alternate embodiment, the quarantine bits are contained in the actual devices connected to the bus.

Setting the quarantine bit or bits quarantines the bus ID 2500 and prevents further remote-node access by local bus nodes. Once a local bus node (or device) has been quarantined, its EUI-to-bus ID translations may not be used again until their validity has been verified. To establish which translations are valid, the topology of the bus is rediscovered. It will be appreciated that this may be accomplished in a variety of ways. To the extent that the old bus IDs 2500 are not useful, the EUI 64 ids 2550 may be used to establish whether a new bus ID 2500 is appropriate for the given device, or whether the given device is no longer accessible (such as when the device is removed). This may be accomplished as discussed above, by reading the EUI 64 ID 2550 of the old bus ID 2500 and determining whether there is a match. If there is a match, the old bus ID 2500 may still be used, while if there is no match, the new bus ID 2500 may be discovered, or discovery may indicate that the device having the EUI 64 ID 2550 in question is no longer accessible. Moreover, a determination may be made that only a few busses have changed, and then only bus IDs 2500 associated with those busses would be verified for proper translations. Otherwise, a determination may be made that enough changes have occurred that all bus IDs 2500 should be re-verified. In an alternative embodiment, the bus bridge may establish whether a translation bus ID 2500 is valid after quarantine is set only when it receives another request to access the device at that bus ID 2500. In this embodiment the establishment of a valid bus ID 2500 only occurs on demand.

At block 2640, it is determined whether a local bus transaction timeout has occurred or not. (A transaction timeout is defined as the length of time established as the maximum for completion of a transaction by a particular bridge or node.) If no transaction timeout has occurred, then at block 2650 reuse of dirty bus IDs 2500 is still blocked. If a transaction timeout has occurred, it may be safely assumed that no dirty bus IDs 2500 are still being used within the systems coupled to the bus. At block 2660, the dirty bus IDs 2500 are scrubbed or cleaned, or otherwise moved from the dirty ID pool 2830 to the free ID pool 2810 for reuse. It will be appreciated that busses or nets with more restrictive routing requirements may cause a group of bus IDs 2500 to be moved from one pool to another collectively, such as when certain busses are tied together logically. In one embodiment, the process will jump to block 2640 upon expiration of the time in a transaction timeout whether the topology of the bus has been properly rediscovered or not. Moreover, it will be appreciated that rearranging or reordering the flow of the process may be accomplished without departing from the spirit of the invention.

It will be appreciated that introduction of a time interval after which the dirty bus IDs 2500 may be reused may prove to be a logistical problem. This time period should be set to avoid problems from reusing bus IDs 2500 that were used to generate requests or resources that are still queued, and to avoid problems from running out of IDs. However, the above process takes advantage of an already existing timeout value in the bus, and uses that parameter for a separate purpose. As has been pointed out, any system that attempts to initiate a transaction may assume that if the transaction timeout has expired, the device it is attempting to communicate with will not respond. From this, the system may assume that a bus ID 2500 that has become invalid, will not be accessed after the transaction timeout.

Figure 24:
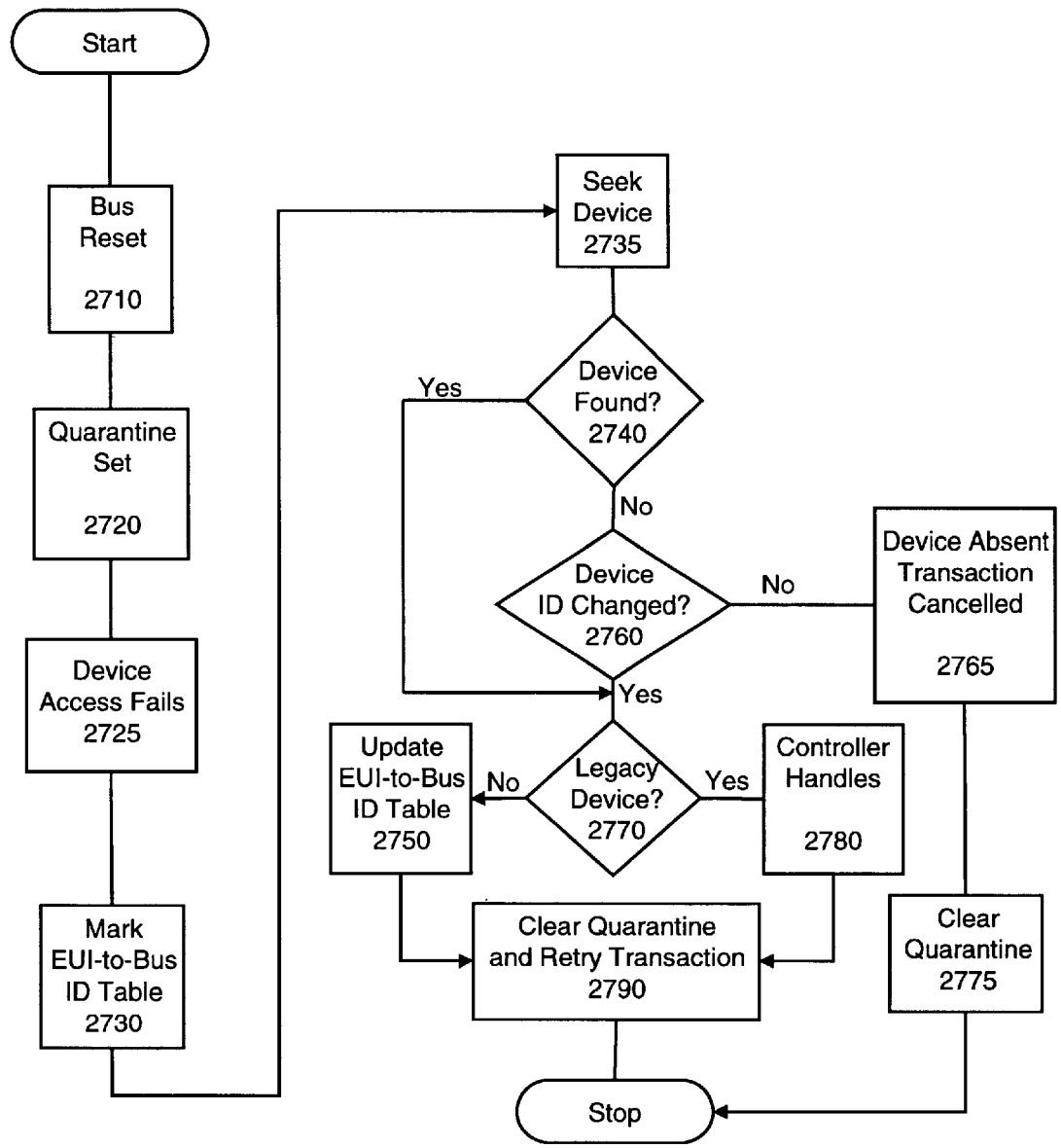
FIG. 24 is a flow diagram of an alternate embodiment of a process for handling quarantine during a bus topology change.

FIG. 24 is a flow diagram of an alternate embodiment of a process for handling quarantine during a bus topology change. At block 2710, a bus reset is received. At block 2720, quarantine is set, such as setting quarantine bits for each currently active bus ID 2500 for example. At block 2725, a device is sought for a transaction based on the old bus ID 2500 assigned to that device prior to the bus reset of block 2710. The device access fails because the device requesting the transaction is quarantined by the portal or bus bridge. At block 2730, the device requesting the transaction marks its EUI-to-bus ID translations as stale or flushes those translations.

At block 2735, the device originally requesting the transaction now seeks the device. In one embodiment, this occurs when the device attempts to read the EUI 64 ID 2550 of the target device based on the old bus ID 2500. It will be appreciated that other methods of seeking the target device may be employed within the spirit and scope of the invention. At block 2740, a determination is made as to whether the device was found at the old bus ID 2500.

If the old Bus ID 2500 for the target device is no longer valid, a determination is made at block 2760 whether the bus ID 2500 of the target device has changed. In one embodiment, this is accomplished by seeking a device within the net having the EUI 64 ID 2550 associated with the target device. If the bus ID 2500 has not changed, the target device is absent, and the attempted transaction is cancelled at block 2765. At block 2775, the quarantine is cleared for the originating device.

If the target device was found at the old bus ID 2500 or if the bus ID 2500 for the device has changed a determination is made as to whether this is a legacy device. If this is not a legacy device, at block 2750 the device originating the transaction updates its EUI-to-Bus ID translation tables. Updating the translation table(s) may include clearing an indication that the translation was stale, entering the proper translation, updating the proper translation, or some combination leading to a valid translation entry. Then, at block 2790, the device originating the transaction clears quarantine and retries the transaction as appropriate. Also, any old bus ID 2500 that is no longer valid will be moved from the used ID pool 2820 to the dirty ID pool 2830.

If the device is determined at block 2770 to be a legacy device, at block 2780 the controller handles the quarantine of the device. Quarantine is detected by the controller, typically due to a timeout expiration on a transaction with the legacy device causing the controller to submit another request to the legacy device. Should the controller never receive an expected device status report or other similar signal or packet, the controller may be expected to investigate, and any packet sent out for investigative purposes would be expected to encounter the quarantine. For a legacy device, the controller's transaction will typically be an attempt to restart a prior transaction that did not complete before the bus reset was received. The controller on the bus will attempt to restart the transaction at the legacy device as if it never began. Furthermore, whereas devices that are not legacy devices will have their own quarantine control, legacy devices can not be expected to maintain any quarantine information, so only the controller (and portals or bus bridges) will track the quarantine status of the legacy device.

The controller determines that the transaction may have failed due to quarantine of the legacy device. Having so detected, the controller is responsible for forcing the cancellation of any possible future legacy device status reports, clearing the quarantine condition, and reactivating the legacy device with the appropriate set of restoration commands at block 2790. However, if the controller is aware that its bus ID 2500 has not changed, it need not clear implied EUI 64 ID 2550 to bus ID 2500 translations, it may only clear the quarantine and then re-enable the legacy device. Note that re-enabling the legacy device may have the practical effect of restarting the transaction with the controller or canceling the previous state of the legacy device.

The specific arrangements and methods herein are merely illustrative of the principles of this invention. Numerous modifications in form and detail may be made by those skilled in the art without departing from the true spirit and scope of the invention. Figures in the application are illustrative of particular embodiments, and it will be appreciated that rearrangement of components or portions of processes into other configurations, in particular rearrangement into parallel or serial configurations or different breakdowns of components or portions of processes does not depart from the spirit of the invention.

What is claimed is:

1. A method of allowing reuse of a bus id while preventing stale address translations, the method comprising receiving an indication of a possible change in a topology of a net;

establishing node ids consistent with the possible change;

quarantining a set of devices coupled to the net, the quarantining causing the use of stale address translations to result in rejected transactions; and allowing reuse of identifiers of devices of the set of devices after a predetermined interval of time elapses following the quarantining.

2. The method of claim 1 wherein:

the indication is a bus reset; and the quarantining occurs in response to the bus reset.

3. The method of claim 1 wherein:

the quarantining includes setting a quarantine bit corresponding to each device of the set of devices.

4. The method of claim 1 wherein:

the establishing includes testing whether previously established identifiers of each device of the set of devices continue to refer to the same devices of the set of devices.

5. The method of claim 1 wherein:

the establishing includes testing whether a previously established identifier of a first device of the set of devices still refers to the first device, the identifier included in a transaction request, the first device quarantined.

6. The method of claim 1 wherein:

the set of devices includes legacy devices having no capability for quarantine and controllers corresponding to the legacy devices, the controllers maintaining quarantine information related to the legacy devices, the controllers establishing whether previously established identifiers of the legacy devices still refer to the same legacy devices.

7. The method of claim 1 wherein:

the establishing includes assigning a new device identifier to a first device which does not respond to a previously established device identifier corresponding to the first device.

8. The method of claim 7 wherein:

the establishing includes assigning a device identifier to a second device, no previously established device identifier corresponding to the second device.

9. The method of claim 1 wherein:
the bus is comprises an IEEE 1394 standard serial bus.
10. The method of claim 1 wherein:
the quarantining occurs when it appears advantageous to recycle node ids.
11. The method of claim 1 wherein:
the quarantining occurs when free node ids are below an acceptable quantity.
12. The method of claim 1 wherein:
the establishing includes maintaining a set of free device identifiers, a set of used device identifiers and a set of dirty device identifiers, the set of used device identifiers corresponding to device identifiers currently assigned to devices, the set of dirty device identifiers corresponding to device identifiers recently assigned to device identifiers and unassignable to other devices, the set of free device identifiers corresponding to device identifiers assignable to other devices.
13. The method of claim 12 wherein:
the establishing includes determining whether dirty device identifiers may be reused.
14. The method of claim 13 wherein:
determining whether dirty device identifiers may be reused includes determining whether a predetermined amount of time has elapsed and after the predetermined amount of time has elapsed, redefining the dirty device identifiers as free device identifiers.
15. The method of claim 14 wherein:
the predetermined amount of time is a transaction time limit of the bus.
16. A method of allowing reuse of a bus id while preventing stale address translations, the method comprising:
receiving an indication of a possible change in a topology of a net;
establishing node ids consistent with the possible change by maintaining a set of free device identifiers, a set of used device identifiers and a set of dirty device identifiers, the set of used device identifiers corresponding to device identifiers currently assigned to devices, the set of dirty device identifiers corresponding to device identifiers recently assigned to device identifiers and unassignable to other devices, the set of free device identifiers corresponding to device identifiers assignable to other devices, and
quarantining a set of devices coupled to the net, the quarantining causing the use of stale address translations to result in rejected transactions.
17. The method of claim 16 wherein:
the establishing includes determining whether dirty device identifiers may be reused.
18. The method of claim 17 wherein:
determining whether dirty device identifiers may be reused includes determining whether a predetermined amount of time has elapsed and after the predetermined amount of time has elapsed, redefining the dirty device identifiers as free device identifiers.
19. The method of claim 18 wherein:
the predetermined amount of time is a transaction time limit of the bus.
20. The method of claim 16 wherein:
the indication is a bus reset; and
the quarantining occurs in response to the bus reset.
21. The method of claim 16 wherein:
the quarantining includes setting a quarantine bit corresponding to each device of the set of devices.

22. The method of claim 16 wherein:
the establishing includes testing whether previously established identifiers of each device of the set of devices continue to refer to the same devices of the set of devices.
23. The method of claim 16 wherein:
the establishing includes testing whether a previously established identifier of a first device of the set of devices still refers to the first device, the identifier included in a transaction request, the first device quarantined.
24. The method of claim 16 wherein:
the set of devices includes legacy devices having no capability for quarantine and controllers corresponding to the legacy devices, the controllers maintaining quarantine information related to the legacy devices, the controllers establishing whether previously established identifiers of the legacy devices still refer to the same legacy devices.
25. The method of claim 16 wherein:
the establishing includes assigning a new device identifier to a first device which does not respond to a previously established device identifier corresponding to the first device.
26. The method of claim 25 wherein:
the establishing includes assigning a device identifier to a second device, no previously established device identifier corresponding to the second device.
27. The method of claim 16 wherein:
the bus comprises an IEEE 1394 standard serial bus.
28. The method of claim 16 wherein:
the quarantining occurs when it appears advantageous to recycle node ids.
29. The method of claim 16 wherein:
the quarantining occurs when free node ids are below an acceptable quantity.
30. A system comprising:
a bus having a reset signal and having a plurality of data signals;
a set of devices, each device of the set of devices coupled to the bus; and
a controller, the controller having a memory configured to store device identifiers corresponding to the devices of the set of devices, the memory further configured to store quarantine information relating to the devices of the set of devices.
31. The system of claim 30 wherein:
the controller further having logic configured to determine whether a first device identifier of the memory corresponding to a first device addresses the first device when the quarantine information related to the first device indicates the reset signal has been active.
32. The system of claim 31 wherein:
the devices of the set of devices have logic configured to receive the reset signal and to halt activity of the devices.
33. The system of claim 31 wherein:
a subset of the devices of the set of devices having no logic configured to halt activity of the devices of the subset of devices in response to reception of the reset signal.
34. The system of claim 33 wherein:
the controller further having logic configured to restart activity of the devices of the subset of devices in response to reception of the reset signal.

35. An apparatus comprising:

means for storing device identifiers corresponding to a set of devices coupled to a bus, the means for storing further storing quarantine information relating to the devices; and means for receiving data signals on the bus.

36. The apparatus of claim 35 further comprising:

means for determining whether a device identifier corresponding to a first device addresses the first device when the quarantine information related to the first device indicates a reset signal has been active on the bus.

37. The apparatus of claim 36 wherein each of the devices further comprises:

means for receiving the reset signal; and means for halting activity of the device.

38. The apparatus of claim 36 further comprising:

means for restarting activity of a subset of the set of devices in response to receiving the reset signal, wherein the subset of devices cannot halt activity in response to receiving the reset signal.

* * * * *